(12) United States Patent
Haartsen et al.

(10) Patent No.: US 11,848,785 B2
(45) Date of Patent: Dec. 19, 2023

(54) WIRELESS STEREO HEADSET WITH DIVERSITY

(71) Applicant: Dopple IP B.V., Emmen (NL)

(72) Inventors: Jacobus Cornelis Haartsen, Rolde (NL); Tjapko Uildriks, Anderen (NL); Aalbert Stek, Emmen (NL)

(73) Assignee: Dopple IP B.V., Assen (NL)

( * ) Notice: Subject to any disclaimer, the term of this patent is extended or adjusted under 35 U.S.C. 154(b) by 368 days.

(21) Appl. No.: 16/957,225

(22) PCT Filed: Dec. 21, 2018

(86) PCT No.: PCT/EP2018/086768
§ 371 (c)(1),
(2) Date: Jun. 23, 2020

(87) PCT Pub. No.: WO2019/129748
PCT Pub. Date: Jul. 4, 2019

(65) Prior Publication Data
US 2020/0396028 A1    Dec. 17, 2020

Related U.S. Application Data

(60) Provisional application No. 62/611,217, filed on Dec. 28, 2017.

(51) Int. Cl.
*H04L 1/1829* (2023.01)
*H04W 4/80* (2018.01)
(Continued)

(52) U.S. Cl.
CPC ............ *H04L 1/1829* (2013.01); *H04L 69/14* (2013.01); *H04L 69/40* (2013.01); *H04R 1/1091* (2013.01); *H04W 4/80* (2018.02); *H04W 84/20* (2013.01)

(58) Field of Classification Search
None
See application file for complete search history.

(56) References Cited

U.S. PATENT DOCUMENTS 7,925,214 B2    4/2011    Weinans et al.
8,433,243 B2    4/2013    Sharma
(Continued)

FOREIGN PATENT DOCUMENTS

EP    2168247 A1    3/2010
EP    2926574 A1    10/2015
(Continued)

*Primary Examiner* — Derrick W Ferris
*Assistant Examiner* — Keith Follansbee
(74) *Attorney, Agent, or Firm* — COATS & BENNETT, PLLC

(57) ABSTRACT

A communication protocol provides improved communication performance between a wireless stereo headset (12) and a host device (19). The communication protocol provides communication paths between the host device (19) and each ear piece (12a, 12b) of the wireless stereo headset (12), as well as a communication path between the two ear pieces (12a, 12b) of the wireless stereo headset (12). In addition to receiving audio information from the host device (19), each ear piece (12a, 12b) may request audio information from the other ear piece (12b, 12a), thus obtaining path diversity. Using special control messages on connection between the ear pieces (12a, 12b), the ear pieces (12a, 12b) inform each other which audio information has been received successfully from the host device (19). Using a common clock broadcast by the host device (19), the ear pieces (12a, 12b) may indicate which audio information was missed and should be forwarded on the communication path (P2, 540, 1620) between the two ear pieces (12a, 12b).

31 Claims, 28 Drawing Sheets

(51) Int. Cl.
    *H04L 69/14*     (2022.01)
    *H04L 69/40*     (2022.01)
    *H04R 1/10*     (2006.01)
    *H04W 84/20*     (2009.01)

(56) References Cited

U.S. PATENT DOCUMENTS

| | | |
|---|---|---|
| 8,660,055 B2 | 2/2014 | Ueda et al. |
| 8,768,252 B2 | 7/2014 | Watson et al. |
| 9,020,437 B2 | 4/2015 | Watson et al. |
| 9,712,266 B2 * | 7/2017 | Linde .................. H04W 4/80 |
| 9,820,323 B1 | 11/2017 | Young et al. |
| 2012/0058727 A1 | 3/2012 | Cook et al. |
| 2013/0266152 A1 * | 10/2013 | Haynie .................. H04R 5/033 |
| | | 381/80 |
| 2017/0111834 A1 * | 4/2017 | Belverato .............. H04R 5/033 |
| 2017/0188152 A1 | 6/2017 | Watson et al. |
| 2018/0084456 A1 * | 3/2018 | Gostev .................. H04L 69/14 |
| 2018/0110088 A1 * | 4/2018 | Zhu ....................... H04W 76/28 |
| 2019/0044576 A1 * | 2/2019 | Thoen .................. H04W 76/14 |

FOREIGN PATENT DOCUMENTS

| | | |
|---|---|---|
| WO | 2007068508 A1 | 6/2007 |
| WO | 2009012158 A1 | 1/2009 |
| WO | 2014086388 A1 | 6/2014 |
| WO | 2018057524 A1 | 3/2018 |

* cited by examiner

WIRELESS STEREO HEADSET WITH DIVERSITY

RELATED APPLICATIONS

This application claims the benefit of U.S. Provisional Patent Application No. 62/611,217, filed Dec. 28, 2017, which is hereby incorporated by reference in its entirety.

TECHNICAL FIELD

The present invention relates generally to audio devices and in particular to truly wireless stereo headsets with robust radio performance.

BACKGROUND

The use of headsets wirelessly connected to host devices like smartphones, laptops, and tablets is becoming increasingly popular. Whereas consumers used to be tethered to their electronic device with wired headsets, wireless headsets are gaining more traction due to the enhanced user experience, providing the user more freedom of movement and comfort of use. Further momentum for wireless headsets has been gained by certain smartphone manufacturers abandoning the implementation of the 3.5 mm audio jack in the smartphone, and promoting voice communications and music listening wirelessly, for example by using Bluetooth® technology.

Wireless headsets typically have a radio transceiver in one ear piece (for example the right ear piece), supporting the communication between the headset and the host device. Since the radio transceiver receives the stereo channels for both the left and right ear, one of the audio channels must be transferred to the other ear piece. This is typically achieved by a galvanic connection, such as a cable or a wire carrying currents and/or voltage signals.

Radio signals tend to be disturbed during propagation from the host device to the headset. Obstacles come between these two, blocking the radio waves and resulting in a Non-Line-of-Sight (NLOS) propagation condition. This is typically encountered when the user is outdoors and his body comes between the host device, such as a smartphone's wireless transceiver, and the headset wireless transceiver. Radio waves are greatly attenuated when they propagate through human tissue. In indoor environments, the radio waves usually reflect from surfaces such as walls and ceiling, thus finding alternative radio paths between the host device and the headset.

More recently, so called truly wireless headsets have appeared on the market. These wireless headsets lack a galvanic connection between the ear pieces, resulting in a product consisting of two completely separate ear pieces. The host device typically communicates the stereo information to one ear piece wirelessly; and forwarding of an audio channel to the other ear piece also occurs wirelessly. Technologies used for the ear-to-ear (e2e) communication can comprise magnetic coupling using near-field communications, or can be based on radio frequency (RF). In the latter case, each ear piece contains a radio transceiver. Since in truly wireless headsets, the host device still communicates with only one ear piece, the same propagation challenges are encountered when used outdoors. Wireless headsets with improved radio performance are therefore desirable.

The Background section of this document is provided to place embodiments of the present invention in technological and operational context to assist those of skill in the art in understanding their scope and utility. Unless explicitly identified as such, no statement herein is admitted being prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, novel and nonobvious aspects of a communication protocol provide improved communication performance between a wireless stereo headset and a host device. The communications protocol provides communication paths between the host device and each ear piece of the wireless stereo headset, as well as a communication path between the two ear pieces of the wireless stereo headset. In addition to receiving audio information from the host device, each ear piece may request audio information from the other ear piece, thus obtaining path (also called space) diversity. Using special control messages on connection between the ear pieces, the ear pieces inform each other which audio information has been received successfully from the host device. Using a common clock broadcast by the host device, the ear pieces may indicate which audio information was missed and should be forwarded on the communication path between the two ear pieces.

In one embodiment, the communication path between the two ear pieces utilizes an RF connection, reusing the radio transceiver also used for ear pieces to communicate with the host device. Time multiplexing is used by the radio transceivers in the ear pieces to either communicate with the host device or communicate with each other. In another embodiment, the communication path between the two ear pieces utilizes magnetic coupling, applying the Near Field Magnetic Induction (NFMI) technology. Since the connection between the two ear pieces operates at a completely different carrier frequency than that used on the connection to the host device, and in addition uses transceivers different from the transceivers used on the connection to the host device, no time multiplexing is required. In yet another embodiment, the communication path between the two ear pieces utilizes a wire. A digital modem is used to transmit and receive packets between the two ear pieces. Since the connection between the two ear pieces operates at a completely different carrier frequency than used on the connection to the host device, and in addition uses transceivers different from the transceivers used on the connection to the host device, no time multiplexing is required.

One embodiment relates to a method of receiving audio content by a wireless stereo headset comprising first and second ear pieces. A bidirectional communication channel between the first ear piece and a host device is established over a first wireless communication piconet. Both the first and second ear pieces monitor the first wireless communication piconet for audio content from the host device. A first packet of audio content, transmitted by the host device on the first wireless communication piconet, is missed or erroneously received by the first ear piece. The first packet of audio content transmitted by the host device on the first wireless communication piconet is correctly received by the second ear piece. An indication that the second ear piece successfully received the first packet of audio content on the first wireless communication piconet is sent to the first ear piece by the second ear piece. An acknowledgement of the first packet of audio content is transmitted by the first ear piece to the host device, to prevent a retransmission of the first packet of audio content by the host device.

Another embodiment relates to a wireless stereo headset comprising first and second ear pieces. The wireless stereo headset comprises a first transceiver in the first ear piece. The first transceiver is adapted to establish a bidirectional communication channel between the first ear piece and a host device over a first wireless communication piconet; monitor the first wireless communication piconet for audio content from the host device; and transmit to the host device on the first wireless communication piconet an acknowledgement in response to receiving an indication from the second ear piece of successfully receiving a first packet of audio content that the first ear piece missed or received erroneously.

Still another embodiment relates to a method of receiving audio content by a wireless stereo headset comprising first and second ear pieces. The first ear piece establishes a bidirectional communication channel between the first ear piece and the host device over a first wireless communication piconet; monitors the first wireless communication piconet for audio content from the host device; in response to correctly receiving a packet containing audio content on the first wireless communication piconet, transmits an acknowledgement of the packet to the host device on the first wireless communication piconet; stores audio content from the packet intended for the second ear piece; and informs the second ear piece of the correctly received packet over a second communication piconet between the first and second ear pieces. Similarly, the second ear piece establishes a bidirectional communication channel between the second ear piece and the host device over a third wireless communication piconet; monitors the third wireless communication piconet for audio content from the host device; in response to correctly receiving a packet containing audio content on the third wireless communication piconet, transmits an acknowledgement of the packet to the host device on the third wireless communication piconet; stores audio content from the packet intended for the first ear piece; and informs the first ear piece of the correctly received packet over the second communication piconet. The host device can avoid retransmitting audio content on either the first or third wireless communication piconets if it receives an acknowledgement on either the first or third wireless communication piconet for the audio content.

Yet another embodiment relates to a method of receiving audio content by a wireless stereo headset comprising first and second ear pieces. A bidirectional communication channel is established between the first ear piece and a host device over a first wireless communication piconet. The first ear piece correctly receives a first packet of audio content transmitted by the host device on the first wireless communication piconet. The first ear piece sends to the second ear piece an indication that the first ear piece successfully received the first packet of audio content. The first ear piece transmits an acknowledgement of the first packet of audio content to the host device, to prevent a retransmission of the first packet of audio content by the host device.

BRIEF DESCRIPTION OF THE DRAWINGS

The present invention will now be described more fully hereinafter with reference to the accompanying drawings, showing several embodiments of the invention. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Electronic devices, such as mobile phones and smartphones, are in widespread use throughput the world. Although the mobile phone was initially developed for providing wireless voice communications, its capabilities have been increased tremendously. Modern mobile phones can access the worldwide web, store a large amount of video and music content, include numerous applications ("apps") that enhance the phone's capabilities (often taking advantage of additional electronics, such as still and video cameras, satellite positioning receivers, inertial sensors, and the like), and provide an interface for social networking. Many smartphones feature a large screen with touch capabilities for easy user interaction. In interacting with modern smartphones, wearable headsets are often preferred for enjoying private audio, for example voice communications, music listening, or watching video, thus not interfering with or irritating other people sharing the same area. Because it represents such a major use case, embodiments of the present invention are described herein with reference to a smartphone, or simply "phone" as the host device. However, those of skill in the art will readily recognize that embodiments described herein are not limited to mobile phones, but in general apply to any electronic device capable of providing audio content.

Figure 1:
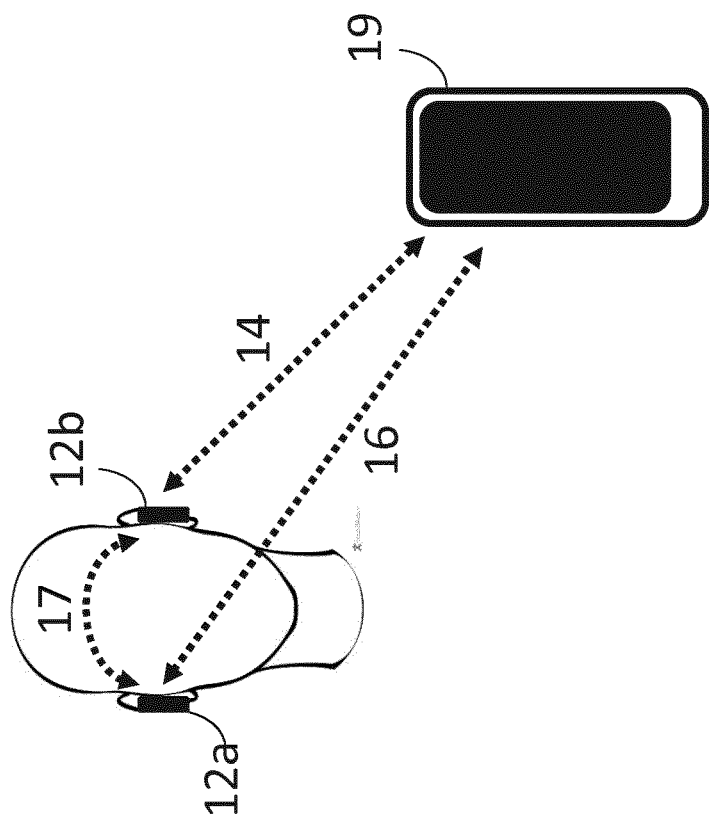
FIG. 1 shows a high-level block diagram of an exemplary use scenario of a user wearing a wireless stereo headset and wirelessly receiving audio content from a host device.

FIG. 1 depicts a typical use case 10, in which a host device 19, such as a smartphone, contains audio content which can stream over wireless connection 14 and/or 16 towards the right ear piece 12a and/or left ear piece 12b of the headset 12. Headset 12 can consist of two separate ear pieces, or the ear pieces may be connected via a string, which may be insulating or conducting. Communication between the ear pieces 12a, 12b (ear-to-ear or e2e communications) is provided via connection 17 which can be wired or wireless.

Figure 2:
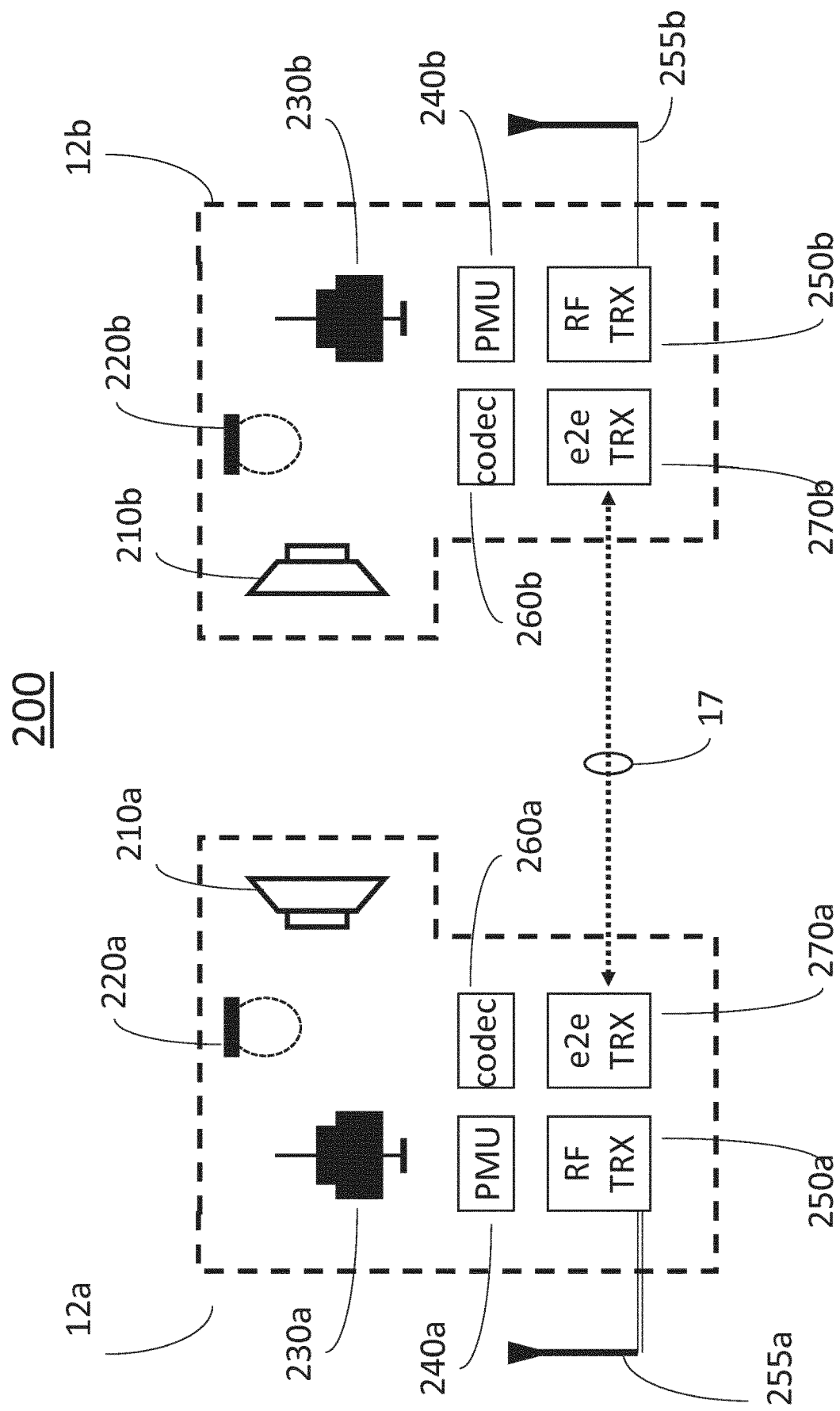
FIG. 2 is a block diagram of a first exemplary wireless stereo headset.

FIG. 2 depicts a high-level block diagram 200 of an exemplary wireless stereo headset 12 consistent with embodiments of the present invention. Ear pieces 12a and 12b consist substantially of the same components, although the placement within the ear piece (e.g. on a printed circuit board) may be different, for example mirrored. Wireless communication between the phone 19 (or any other host device) and the headset 12 is provided by an antenna 255a and a radio transceiver 250a in the right ear piece 12a, and/or is provided by an antenna 255b and a radio transceiver 250b in the left ear piece 12b (viewed facing a user, as in FIG. 1). Radio transceivers 250a and 250b are low-power radio transceivers covering short distances, for example a radio based on the Bluetooth® wireless standard (operating in the 2.4 GHz ISM band). The use of radio transceivers 250a and 250b, which by definition provide two-way communication capability, allows for efficient use of air time (and consequently low power consumption) because it enables the use of a digital modulation scheme with an automatic repeat request (ARQ) protocol.

Transceivers 250a and 250b may include a microprocessor (not shown) controlling the radio signals, applying audio processing (for example voice processing such as echo suppression or music decoding) on the signals exchanged with radio transceivers 250a and 250b, or may control other devices and/or signal paths within the ear piece 12a and 12b, respectively. Alternatively, this microprocessor may be a separate circuit in the ear piece, or maybe integrated into another component present in the ear piece.

Codecs 260a and 260b include Digital-to-Analog (D/A) converters, the outputs of which connect to a right speaker 210a and left speaker 210b, respectively. For embodiments that further include a voice mode, the codecs 260a and/or 260b may further include Analog-to-Digital (ND) converters that receive input signals from microphones 220a and 220b, respectively. To obtain beamforming for enhanced voice pickup, more than one microphone 220 may be embedded in one ear piece, then also requiring additional Analog-to-Digital (A/D) converters in the codec 260. Alternatively, digital microphones may be used, which do not require A/D conversion and may provide digital audio directly to the microprocessor.

Power Management Units (PMU) 240a and 240b provide stable voltage and current supplies to all electronic circuitry. Finally, each ear piece is powered by a battery 230 which typically provide a 3.7V voltage and may be of the coin cell type. The battery 230 can be a primary battery, but is preferably a rechargeable battery.

Additionally, ear-to-ear (e2e) transceivers 270a and 270b support a communication link 17 between right ear piece 12a and left ear piece 12b. In one embodiment, the RF transceivers 250a and 250b are reused for the e2e communications, in which case there are no separate components 270a and 270b. In another embodiment, 270a and 270b are transceivers using magnetic coupling, for example using the Near-Field Magnetic Induction (NFMI). A suitable transceiver is the NFMI radio chip Nx2280 available from NXP Semiconductors of The Netherlands. In yet another embodiment, transceivers 270a and 270b represent modems supporting a digital communication protocol over a wire 17 between ear pieces 12a and 12b.

Host devices, for example smartphone 19, make use of standardized wireless protocols to insure interoperability with a range of wireless and wearable devices from different vendors, used in various parts of the world. The most widely deployed protocol for wireless (mono and stereo) headsets is the Bluetooth wireless protocol. Although the phone 19, acting as master, could support multiple radio connections simultaneously (like wireless connections 14 and 16 in FIG. 1), the profile A2DP (Advanced Audio Distribution Profile) is used for streaming stereo information from the phone 19 to the headset 12 using a single radio connection. In FIG. 1 this means that wireless connections 14 and 16 are substantially the same, albeit that the propagation conditions from the phone 19 to the right ear piece 12a may differ from the propagation conditions from the phone 19 to the left ear piece 12b. The phone 19 can establish a two-way communication link to only one of the ear pieces 12, referred to herein as the primary ear piece. Yet, since radio signals propagate through space in an unconfined manner, the other, secondary, ear piece can still receive the radio signals transmitted by the phone 19. It should be noted that only one ear piece 12 (the primary ear piece—referred to herein as 12p, which may be either 12a or 12b as depicted in the Figures) can sustain a two-way connection to the phone 19; the other (secondary) ear piece 12s merely supports a one-way connection from the phone 19 to the ear piece 12s (that is, the secondary ear piece 12s listens on the connection from the phone 19 to the primary ear piece 12p). Information needed by the secondary ear piece 12s to decode and decrypt the data sent by the phone 19 is provided by the primary ear piece 12p via the e2e link 17.

In order to obtain a robust connection between the phone 19 and the primary ear piece 12p, and between the phone 19 and the secondary ear piece 12s, diversity is applied. This means that audio information sent by the phone 19 can arrive at the ear pieces 12p, 12s along different paths, thus providing space or path diversity. For example, audio information for ear piece 12b may be delivered directly via connection 14, but may also be delivered indirectly via connection 16 cascaded with connection 17. Likewise, audio information for ear piece 12a may be delivered directly via connection 16, but may also be delivered indirectly via connection 14 cascaded with connection 17. Note that connection 17 may be a wireless or wired connection. Indeed, connection 17 may use the same radio transceivers as being used for the wireless links 14 and 16 between the ear pieces 12 and the phone 19. The phone 19 may have to retransmit a packet if, even after applying space diversity, not all audio information has arrived at each ear piece 12a, 12b. But preferably, a diversity protocol is applied in which the number retransmissions sent by phone 19 is based on the best link between the phone 19 and each of the ear pieces 12a, 12b. More specifically, phone 19 can abstain from retransmissions if the data has arrived in at least one of the ear pieces 12p or 12s. Several embodiments discussed herein, where details of the diversity protocols are presented.

Figure 3:
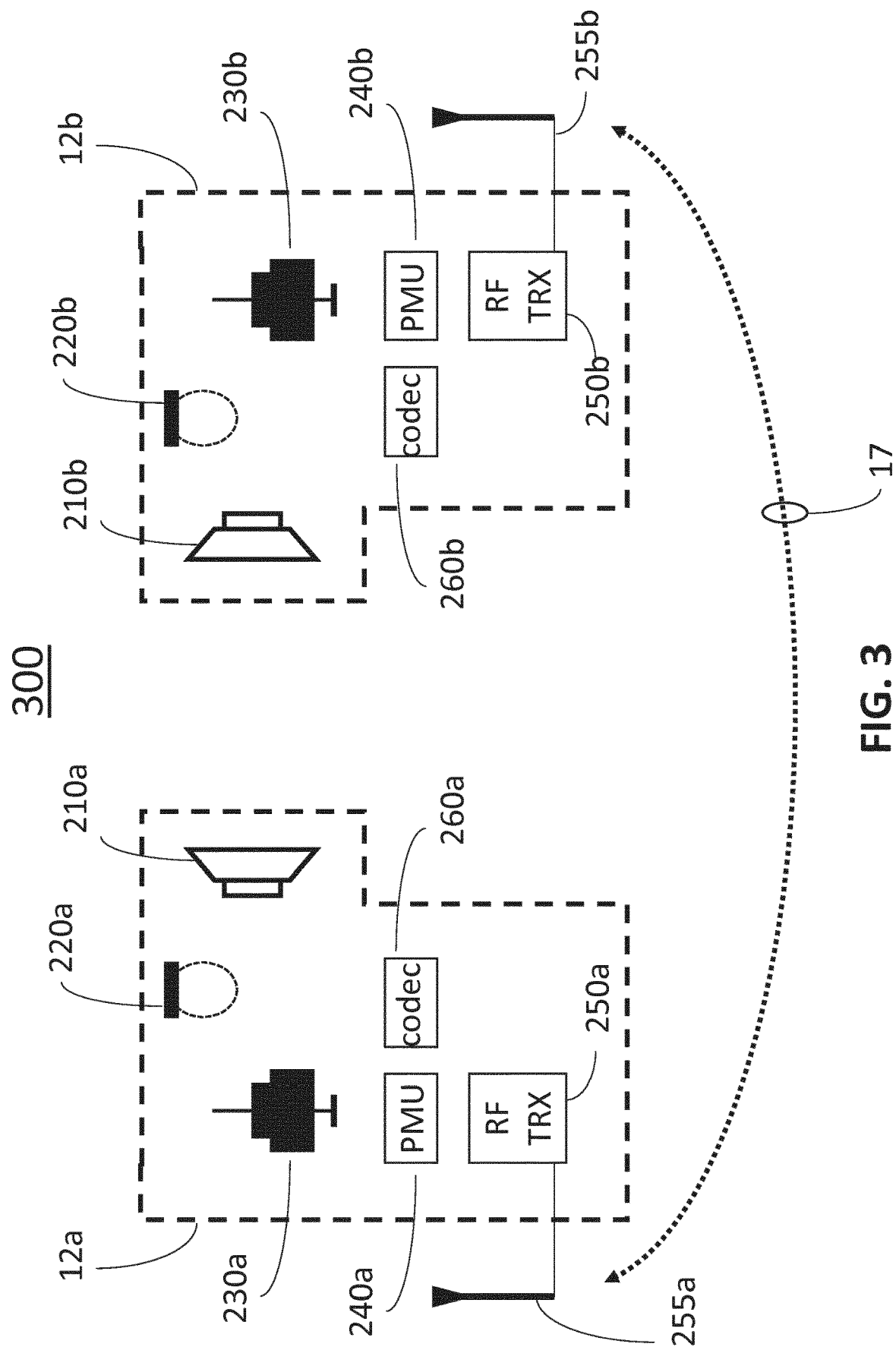
FIG. 3 is a block diagram of a second exemplary wireless stereo headset.

One embodiment of a wireless headset 300 using space diversity is shown in FIG. 3. The headset configuration is substantially the same as shown in FIG. 2, with the exception of the e2e transceivers 270a and 270b. In the embodiment of 300, the e2e communication link 17 is supported by RF transceivers 250a and 250b, which also support the wireless communication links to the smartphone 19. Packets exchanged between the ear pieces 12 and the smartphone 19 are based on a standard protocol, such as the Bluetooth Wireless Technology standard.

Figure 4:
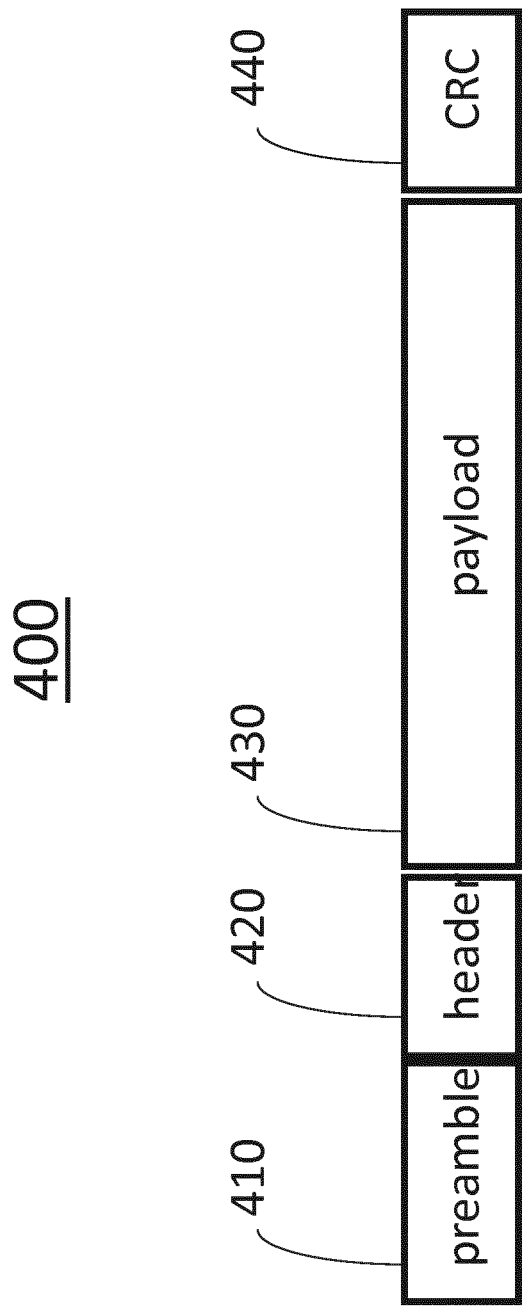
FIG. 4 is an example of a radio packet as used by the Bluetooth® wireless standard.

An example of a typical Bluetooth packet 400 is shown in FIG. 4. The packet may consist of a preamble 410, a header 420, a payload 430, and a Cyclic Redundancy Check (CRC) 440. The preamble 410 may train the receiver to obtain proper frequency synchronization and symbol timing. The preamble 410 may further contain a unique identifier that identifies the connection (such as an access code). The header 420 may include an indication what type of payload is used (for example including Forward Error Correction, FEC, or not), how many time slots are covered by the packet (which is a coarse indication of the packet length), and may include information about an Automatic Retransmission Query (ARQ) scheme like sequence numbers and ACK/NACK information. The payload 430 typically contains the audio information. It may include a length indicator, providing the exact number of bits carried in the packet. The receiver can check the received packet for errors using the CRC or another checksum 440.

Usually, the preamble 410 and header 420 are short and heavily coded. Errors will most likely occur in the payload 430. Two types of packet errors may occur—referred to herein as an erroneous packet and a missed packed. If the noise or interference is moderate, most likely, the preamble 410 and header 420 will be received correctly, but the payload 430 may have errors, resulting in a CRC check failure and a discarding of the packet. Although the receiver will discard the packet, it will have knowledge about the timing of the packet and its length (and, more importantly, when subsequent packets may arrive). This type of packet error is referred to herein as an erroneous packet. On the other hand, if noise or interference is substantial, the receiver may not notice at all that a packet has arrived. Therefore, it will have no knowledge of the packet arrival time and its length. This type of packet error is referred to herein as a missed packet. In embodiments of the present invention, actions taken by the receiver will be different for an erroneous packet and for a missed packet.

Figure 5A:
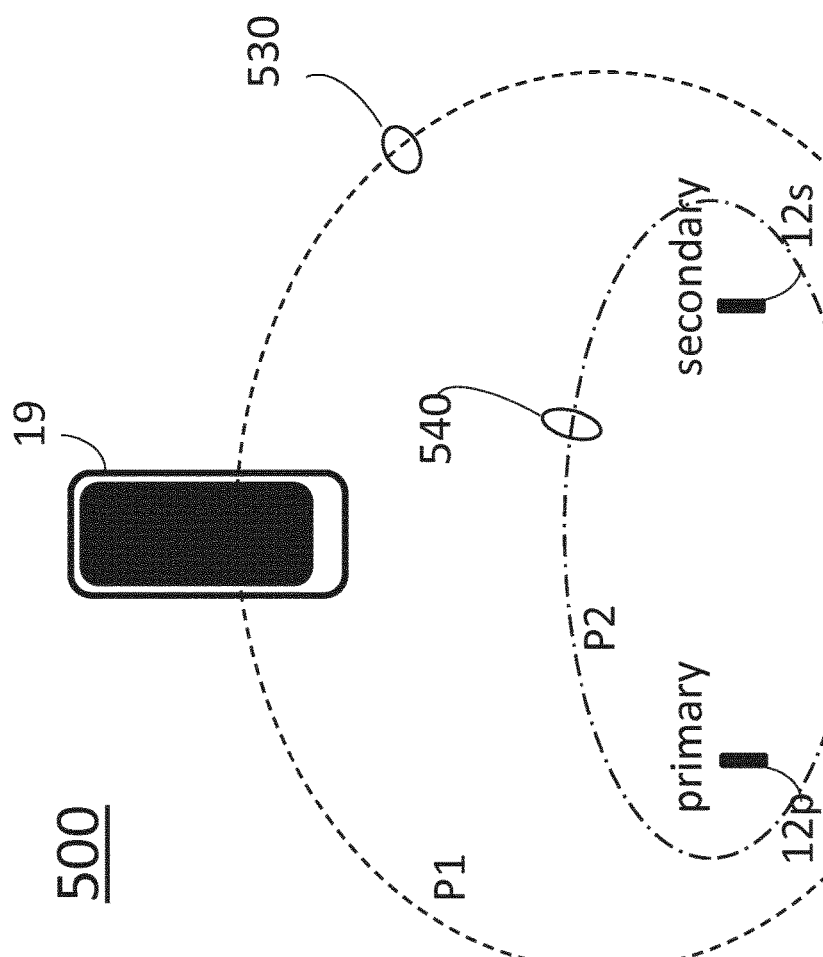
FIG. 5A shows two Bluetooth piconets.

In one embodiment, wherein the link 17 is RF, preferably Bluetooth transceivers support the connections between the different wireless transceivers 250a, 250b. FIG. 5A depicts a use case 500 in which two piconets, P1 530 and P2 540 are active. The first piconet P1 provides the communication between smartphone 19 and the primary and secondary ear pieces 12p and 12s (either of which could be either 12a or 12b, in the alternative). The smartphone 19 has a two-way connection towards the primary ear piece 12p. The secondary ear piece 12s in piconet P1 can receive radio packets from the smartphone 19, and may also receive radio packets from the primary ear piece 12p. Yet, in piconet P1, the secondary ear piece 12s cannot send a packet to the smartphone 19 (since smartphone 19 has only knowledge about the primary ear piece 12p) or to the primary ear piece 12p. For communicating with the primary ear piece 12p, the secondary ear piece 12s makes use of the second piconet P2 540, which forms the e2e communication link between the ear pieces 12p, 12s. Since in each ear piece 12, a single radio transceiver 250 is used to support both piconet P1 530 and piconet P2 540, time division multiplexing (also called scatternet) must be applied where the transceiver alternatively operates in piconet P1 530 and in piconet P2 540, but never in both piconets at the same time.

Figure 5B:
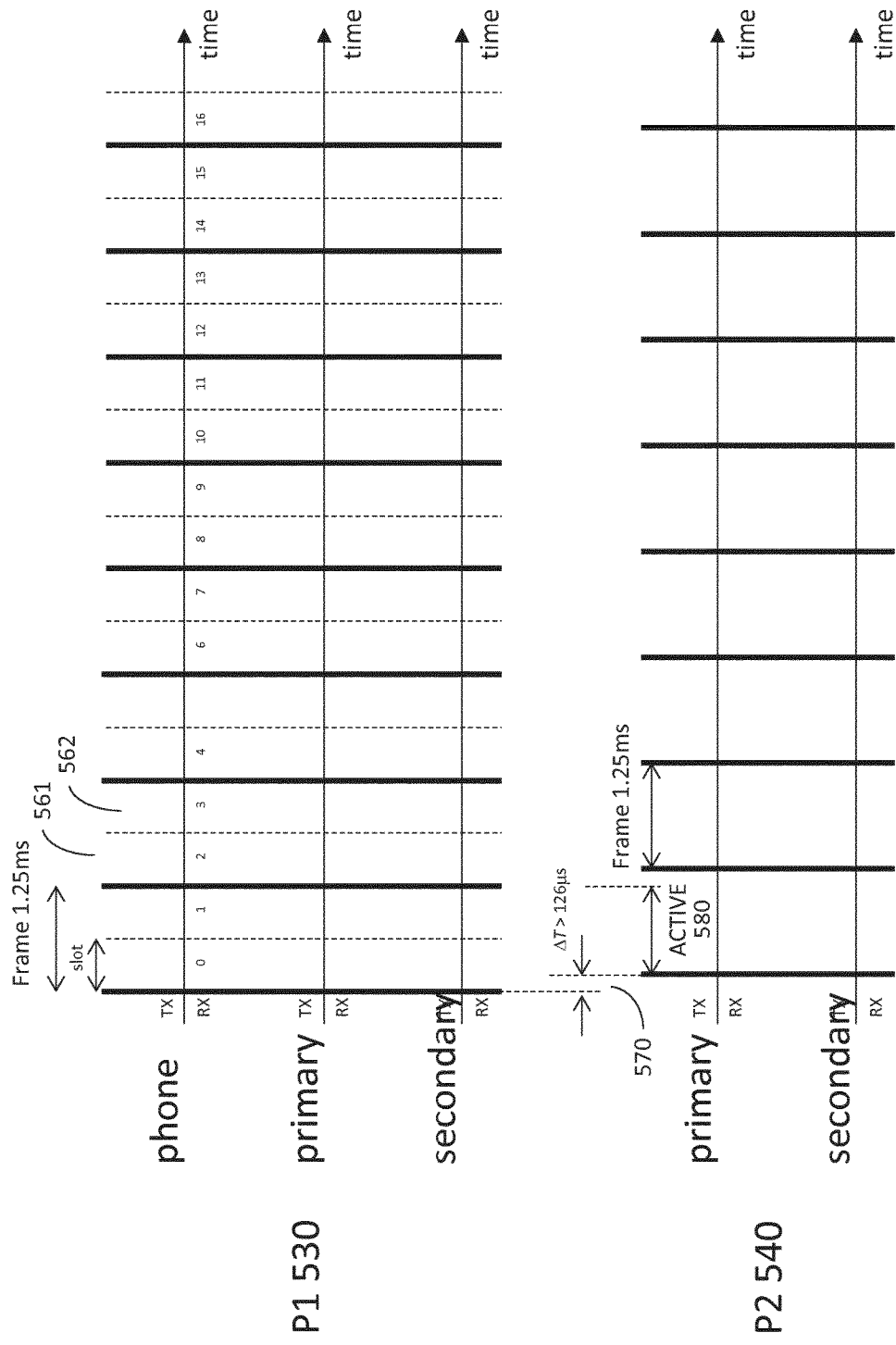
FIG. 5B shows two timing diagrams staggered with respect to each other.

Example timing diagrams for P1 530 and P2 540 are shown in FIG. 5B. Frames of length 1.25 ms are defined. The frames for P1 are divided into a downlink slot 561 (from the host device 19 to the ear pieces 12p, 12s) and an uplink slot 562 (from the primary ear piece 12p to host device 19). For P2, the time line is divided into frames of 1.25 ms as well, but various slot alternatives are possible. Important to note is the time staggering 570 between the frames in P1 and frames in P2, by an offset ΔT of at least 126 μs. This allows both primary and secondary ear pieces 12p, 12s to detect any packet transmission sent by the host device 19 on P1. Referring to the packet 400 in FIG. 4, 126 us corresponds to the length of preamble 410 and header 420 combined. When receiving the preamble and header, the ear pieces 12p, 12s can derive whether a valid packet was sent on P1 addressing the primary ear piece 12p. If this is the case, both ear pieces 12p, 12s will continue to listen for this host device packet. If this is not the case, both ear pieces 12p, 12s may switch to P2 to communicate between each other. Activity on P2 must have stopped before the arrival of the next frame boundary on P1, so that primary and secondary ear pieces 12p, 12s can again listen on P1—that is, communication on P2 is restricted to the ACTIVE window 580 shown in FIG. 5B. With this setup, a packet sent by the host device 19 will never be missed by the ear pieces 12p, 12s because they happened to be communicating with each other on P2.

It will be readily apparent to one of ordinary skill in the art that the role of primary ear piece 12p and the role of secondary ear piece 12s may be interchanged. In fact, these roles may be interchanged dynamically based on the propagation conditions the ear pieces 12 experience instantaneously towards the smartphone 19. For the purpose of discussion, assume that initially the right ear piece 12a assumes the role of primary ear piece 12p; the left ear piece 12b is then the secondary ear piece 12s.

Figure 6:
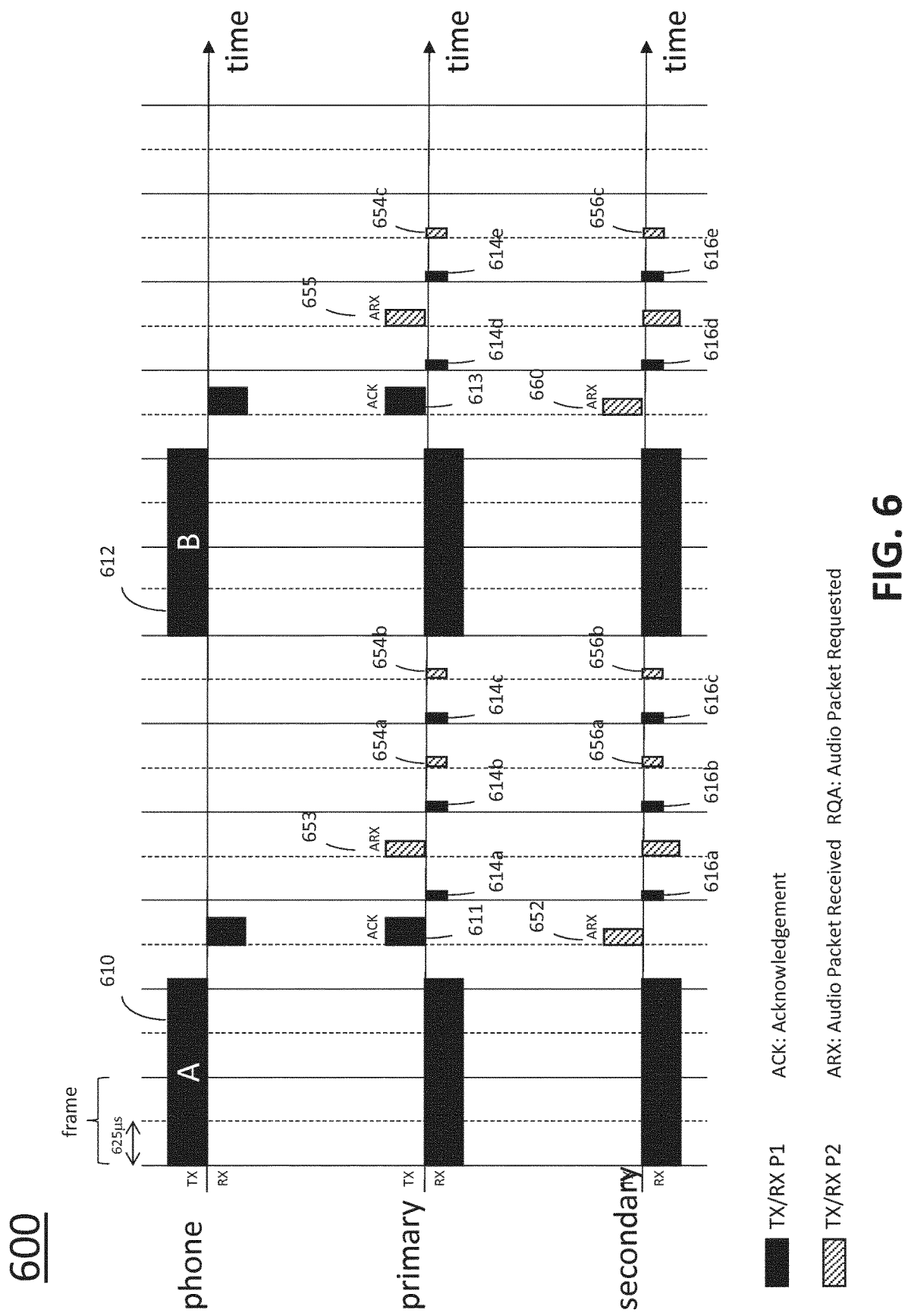
FIG. 6 is a first data flow and timing diagram of a first communication protocol.

FIG. 6 is a first data flow and timing diagram 600 of a communication protocol providing diversity in the embodiment of FIGS. 3 and 5. A time-slotted scheme is used with a time slot having a nominal duration of 625 μs, and a frame containing two consecutive slots. For ease of visualization, the time offset ΔT between the frames of P1 and P2 has been chosen to be 625 □s, corresponding to the P1 slot duration. Packets are aligned with the frame timing, and for each new packet a different carrier frequency is used according to a pseudo-random frequency hopping pattern as defined in the Bluetooth® standard. A Bluetooth® transceiver alternatively transmits and receives. A first piece of stereo audio information A is carried by a standard Bluetooth packet 610 (for example of type 2-DHS, using 2 Mb/s pi/4-QPSK without coding and covering 5 time slots). This packet 610 is sent by the smartphone 19 on piconet P1 530 and may be received by both the primary ear piece 12p and the secondary ear piece 12s. In response to the successful reception of packet 610, the primary ear piece 12p returns an acknowledgement (ACK) packet 611 to the smartphone 19, also on piconet P1 530.

In FIG. 6, all packets transmitted on P1 530 (the link to smartphone 19) are represented by a solid black box located above the time line; the solid black boxes below the timeline represent receive windows with the receiver listening on piconet P1 530. Similarly, all packets transmitted on the piconet P2 540 (the e2e link) are represented by a dashed black box located above the time line; the dashed black boxes below the timeline represent receive windows with the receiver listening on piconet P2 540. Furthermore, in FIG. 6, frame boundaries on P1 are denoted by solid vertical lines; slot boundaries on P1 are denoted by dotted vertical lines. Due to the time staggering offset of one slot, frame boundaries on P2 are denoted by dotted vertical lines. Packet transmission on P1 is aligned with the solid vertical lines whereas packet transmission on P2 is aligned with the dotted vertical lines.

Since the smartphone 19 may transmit a packet at the beginning of any frame in P1 530 piconet, primary and secondary ear pieces 12p and 12s must listen on the P1 530 piconet at the beginning of each frame, as depicted by listen instances 614a-e for primary ear piece 12p and listen instances 616a-e for secondary ear piece 12s. Note that a Bluetooth receiver must check only the first part of the frame to detect whether a valid access code (in preamble 410) is present, and may go to sleep for the remainder of the frame if no valid access code is detected. At the same time that the primary ear piece 12p sends the ACK packet 611 on piconet P1 530, the secondary ear piece 12s sends an Audio Packet Received (ARX) 652 on piconet P2 540 to indicate to the primary ear piece 12p that it has received the audio packet 610 successfully. Since the primary ear piece 12p is tuned to piconet P1 530, the ARX packet 652 will not be received, but its diversity purpose will be explained later.

At the next frame, when the primary ear piece 12p has listened to the piconet P1 530 at receive instance 614a and has not detected a new packet arriving from the smartphone 19, it will send an Audio Received Packet ARX 653 on piconet P2 540. The secondary ear piece 12s will receive this packet, as both the primary and secondary ear pieces 12p, 12s will listen to the piconet P2 540 at the beginning of every second slot, in every frame in which they are not active in communications on P1 or P2. The listen instances on piconet P2 540 are represented by 654a-c for primary ear piece 12p and by 656a-c for secondary ear piece 12c. Note that when there is no activity on P1, the activity on P2 may be reduced as well; in this case, primary ear piece 12p and secondary ear piece 12s may not listen during the beginning of every P2 frame 654a-c and 656a-c, but at a lower duty cycle. With the reception of ARX 653, the secondary ear piece 12s knows that primary ear piece 12p has correctly received the audio information of packet A 610. Over successive frames, both the primary ear piece 12p and the secondary ear piece 12s alternatively listen on piconet P1 530 (at the first slot of each frame) and piconet P2 540 (at the second slot of every frame) until a second audio packet B 612 arrives from the smartphone 19, and the procedure is repeated.

Figure 7A:
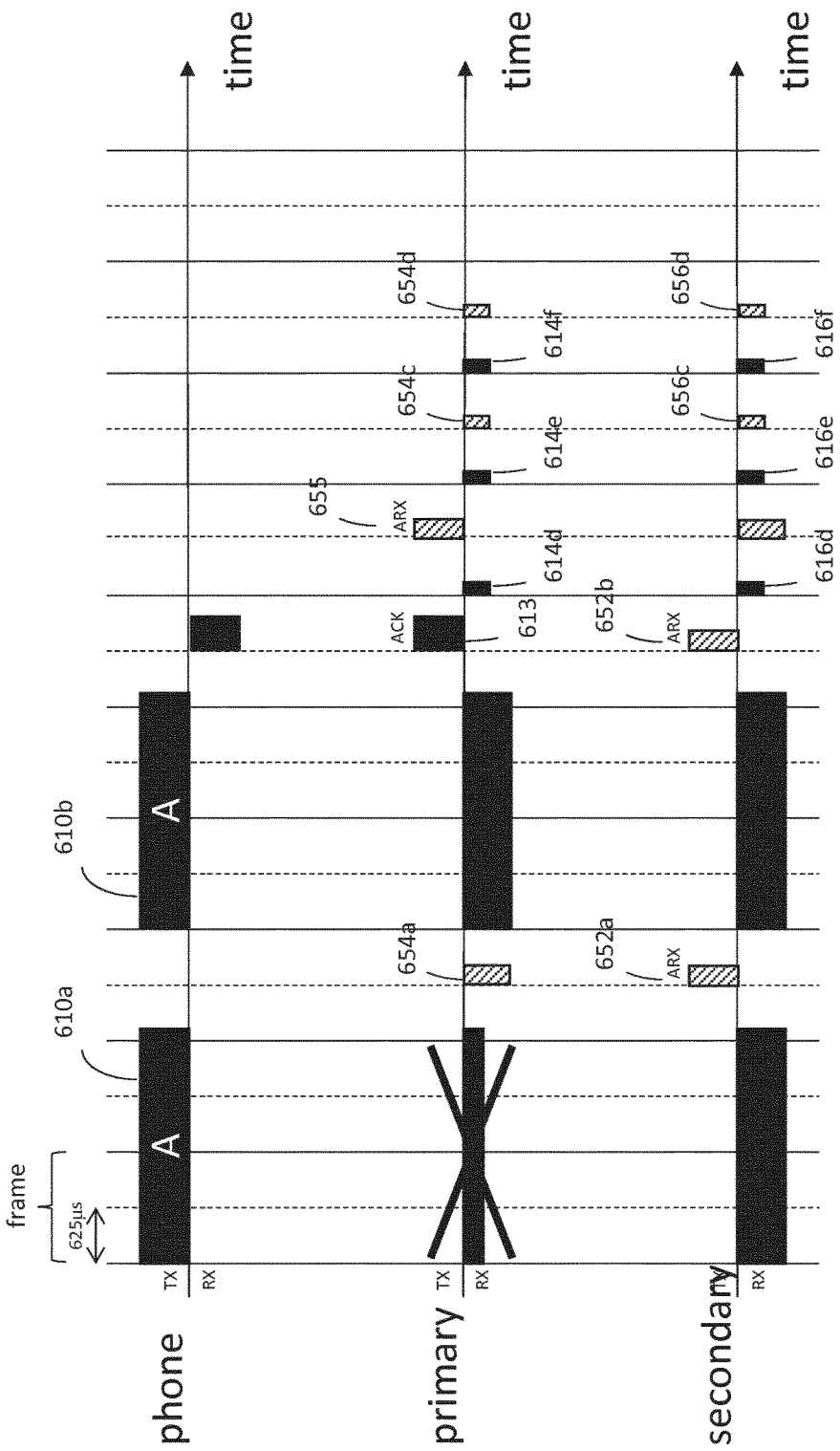
FIG. 7A is a second data flow and timing diagram of the first communication protocol.

FIG. 7A is a second data flow and timing diagram 700 of a communication protocol providing diversity in the embodiment of FIGS. 3 and 5. In this case, it is assumed that the primary ear piece 12p erroneously receives audio packet A 610a sent by smartphone 19. That is, the preamble (access code) and header are received correctly, but the CRC does not check and the packet is discarded by the primary ear piece 12p. This is indicated in FIG. 7A by a reduced-size reception, crossed out by an "X." Consequently, the primary ear piece 12p will not send an ACK packet on the first piconet P1 530 at the next slot boundary as before, but instead will listen to the second piconet P2 540 at instant 654a. Since the secondary ear piece 12s has received the audio packet A successfully, it will send the ARX packet 652a on piconet P2 540 as before. The primary ear piece 12p is thus informed that the secondary ear piece 12s has the audio information that the primary ear piece 12p had to discard. Yet, since the smartphone 19 did not receive an ACK for the audio packet 610a, it may decide to directly retransmit packet 610b with the same audio information A as was contained in audio packet 610a. In this example, this audio packet is received by primary ear piece 12p successfully.

What will follow is the same procedure for successful packet arrival as was described in diagram 600. That is, secondary ear piece 12s may send an ARX packet 652b on piconet P2 540. If it had received the retransmission erroneously or had missed it completely, it would not send the ARX packet 652b, but this would have no consequence for the rest of the procedure. The primary ear piece 12p will not receive this ARX packet 652b, as it returns an ACK packet 613 to the smartphone 19 on piconet P1 530 at the same slot boundary. It then sends its own ARX packet 655 on piconet P2 540, thus informing the secondary ear piece 12s that it has received the audio information successfully. Since both ear pieces 12 have received the audio information, no further action is taken, apart from listening alternatively on piconet P1 530 (first slot of each frame) and piconet P2 540 (second slot). Since the audio packet 610b was acknowledged, the smartphone 19 will take no further action.

Figure 7B:
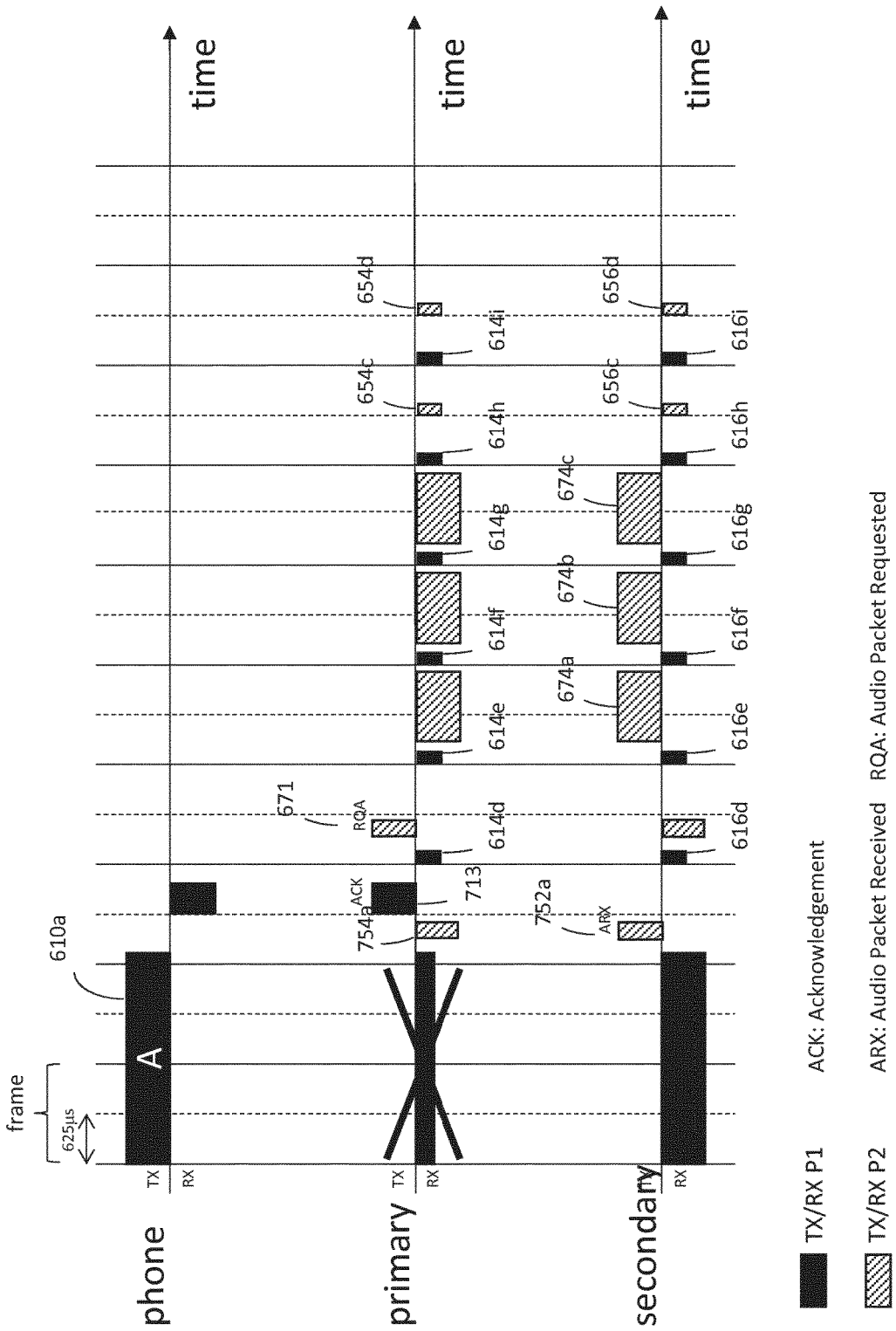
FIG. 7B is an optimized second data flow and timing diagram of the first communication protocol.

In the example shown in FIG. 7A, the phone 19 applied a retransmission since it did not receive an ACK from the primary ear piece 12p. The primary ear piece 12p received an ARX 652a from the secondary ear piece 12s, and could have sent an ACK to the phone 19, and later retrieve the failed packet from the secondary ear piece 12s. However in the timing structure of FIG. 7A, with a time staggering of ΔT=625 µs, there was no time to send an ACK by the primary ear piece 12s to the phone 19 after it had received the ARX packet 652a from secondary ear piece 12s. Yet, if a faster implementation allows, the time staggering ΔT can be made smaller, and the ARX and ACK may fit before the next frame start on P1. This is illustrated in FIG. 7B. Directly after the end of the packet reception, the secondary ear piece 12s sends an ARX 752a to the primary ear piece 12p on piconet P2. In the next uplink slot on P1, the primary ear piece 12p can then send an ACK 713 to the phone 19, thus preventing the additional retransmission 610b shown in FIG. 7A. The primary ear piece 12p retrieves the audio content data from the secondary ear piece 12s, as described below.

Figure 8:
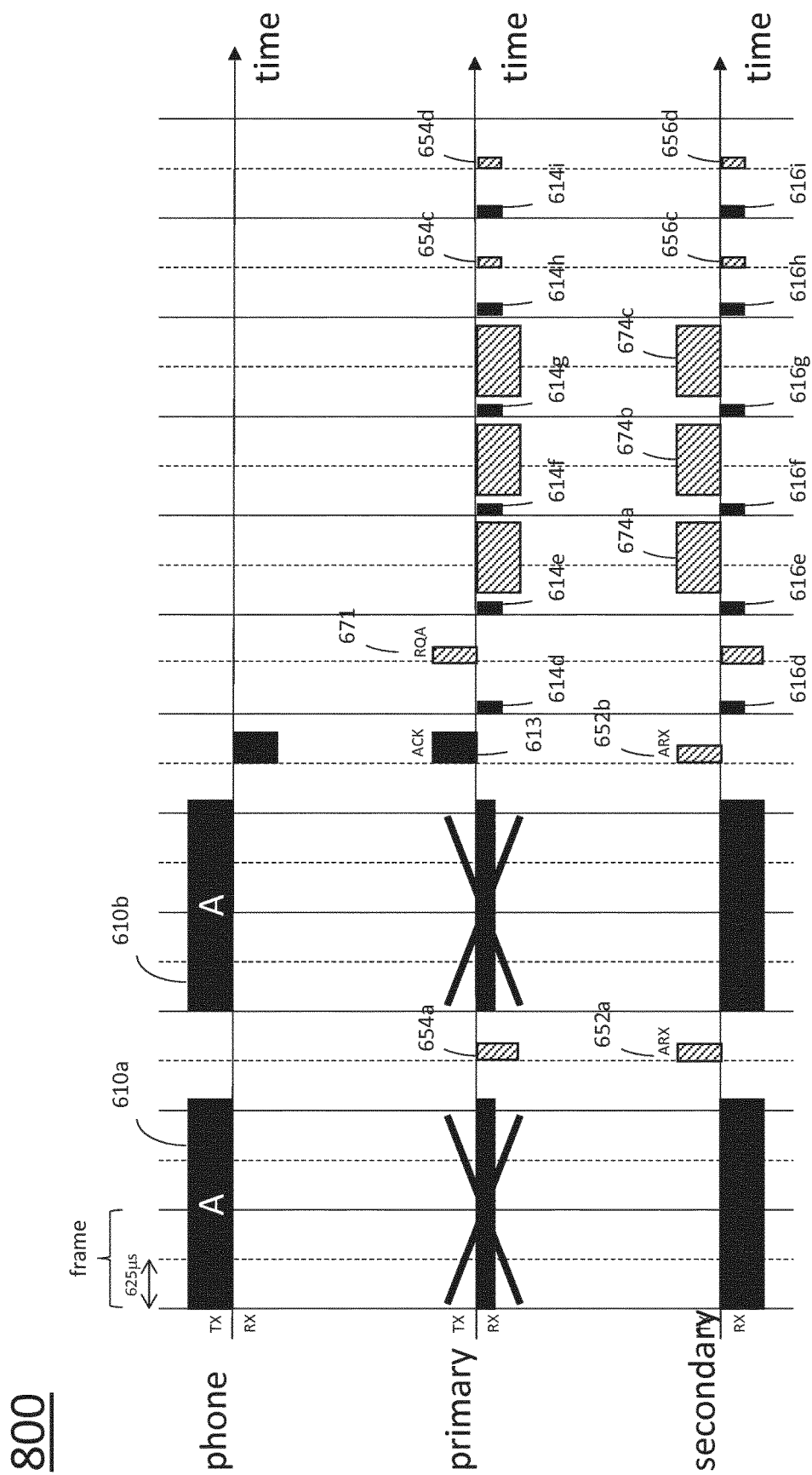
FIG. 8 is a third data flow and timing diagram of the first communication protocol.

FIG. 8 is a third data flow and timing diagram 800 of a communication protocol in the embodiment of FIGS. 3 and 5, wherein the diversity concept is exploited. In contrast to the situation in FIG. 7A, it is now assumed that the retransmitted audio packet 610 is also received erroneously by primary ear piece 12p. Yet, since primary ear piece 12p knows that the desired audio information is present in secondary ear piece 12s (the indication of which was transmitted in ARX packet 652a, and received at 654a), it will return an ACK packet 613 on piconet P1 530 regardless. As a result, the smartphone 19 will not initiate a second retransmission. Yet, the primary ear piece 12p now must retrieve the desired audio information from the secondary ear piece 12s. It therefore will send a Request Audio (RQA) packet 671 on piconet P2 540 to ear piece 12s (on a second slot boundary, having confirmed at the first slot boundary no packet is incoming on piconet P1 530 by listening at 614d). On receiving this RQA packet 671, the secondary ear piece 12s will start a data exchange to the primary ear piece 12p to transfer the desired audio information in the subsequent frames using data packets 674a-c. Note that at the beginning of each frame, the ear pieces 12 first listen to piconet P1 530 for transmissions from the smartphone 19. In one embodiment, data packets 674a-c may be aligned with the second slot in each frame (not shown).

Figure 9B:
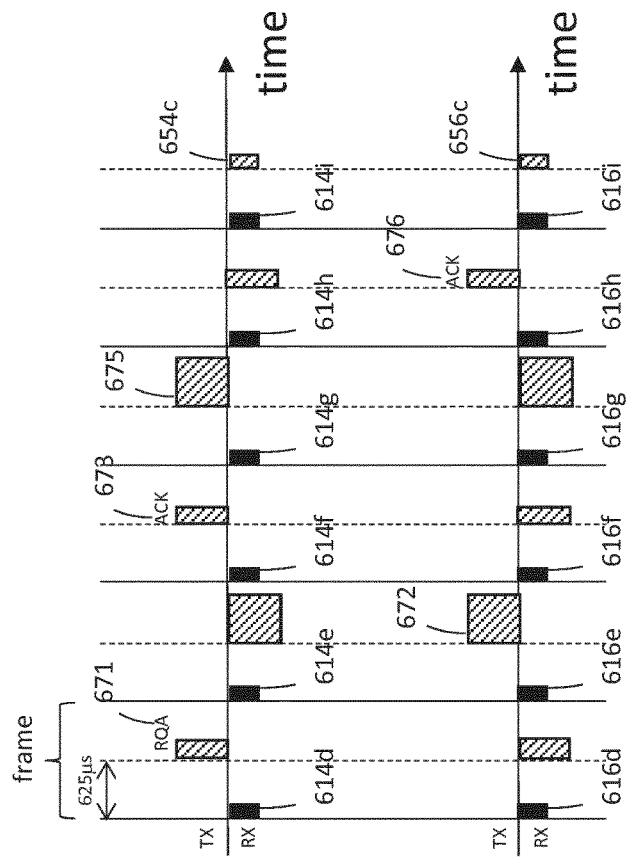
FIGS. 9A and 9B are data flow and timing diagrams of e2e link control signaling in the first communication protocol.
Figure 9A:
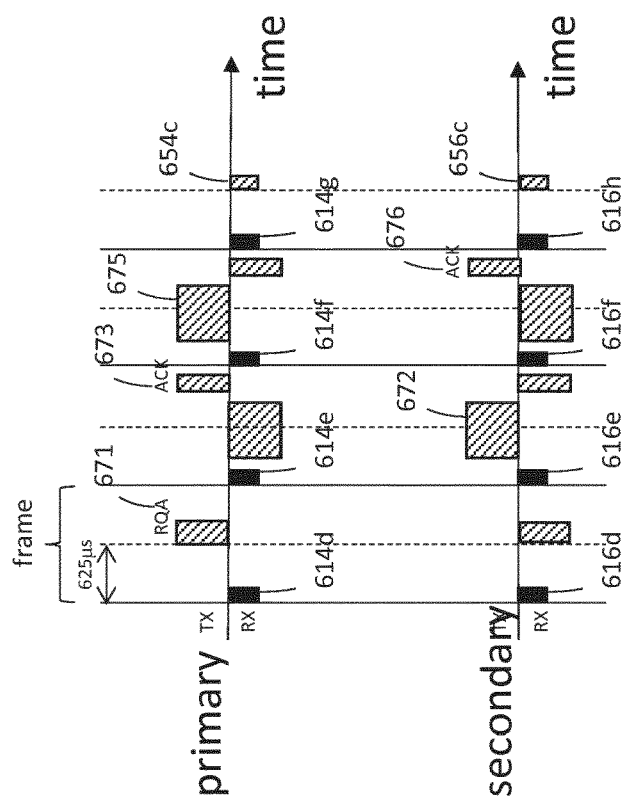

An ARQ procedure may be applied on the e2e link 540 as well, two examples of which are shown in FIGS. 9A and 9B. In FIG. 9A, each data packet sent on the e2e link is directly acknowledged in the same frame. For example, data packet 672 sent by the secondary ear piece 12s on piconet P2 540 is directly acknowledged by ACK packet 673 sent by the primary ear piece 12p inside the same frame. ACK packet 673 may not necessary have the same format as the ACK packets 611, 613 (FIGS. 6-8) used on piconet P1 530. Likewise, data packet 675 sent by the primary ear piece 12p on piconet P2 540 is directly acknowledged by the secondary ear piece 12s by ACK packet 676 inside the same frame.

In FIG. 9B, each data packet sent on the e2e link is acknowledged in a subsequent frame. For example, data packet 672 sent by the secondary ear piece 12s on piconet P2 540 is acknowledged by ACK packet 673 sent by the primary ear piece 12p in the next frame (at the second slot, after listening 614 for a packet from the smartphone 19 at the first slot). Likewise, data packet 675 sent by the primary ear piece 12p on piconet P2 540 is directly acknowledged by the secondary ear piece 12c by ACK packet 676 in the next frame. Both for FIGS. 9A and 9B, different ARQ schemes may be applied. Instead of an ACK for each single packet, multi packets may be acknowledged in a single ACK packet 673. ARQ schemes like Stop-and-Wait, Go-back-N, or selective repeat are also used in some embodiments.

It is understood that as long as the smartphone 19 sends packets, the ear pieces 12 are active on piconet P1 530 and no data can be exchanged on the e2e link, piconet P2 540. This is because the transceiver 250 can be active on only one piconet at one point in time. It may happen that the smartphone 19 sends audio information in bursts, i.e., a number of consecutive audio packets 610 are sent in short sequence, leaving no time window for the e2e link 17 to forward packets if so requested. If a number of audio packets is missed by one of the ear pieces, the other ear piece must buffer those audio packets and forward them on request as soon as no more audio information is sent on piconet P1 530. Some audio packets in the burst may have been received correctly, and some not. In order avoid redundant forwarding, the received audio packets should be numbered. The media packet inside audio packet 610 may have a sequence number, depending on the audio codec protocol used, but this is not the case for all protocols. Therefore, it is desirable to apply (additional) numbering in embodiments of the present invention.

In some embodiments, the Bluetooth system clock on piconet P1 530 is used for packet numbering. For a frequency-hopping and time-slotted communication system like Bluetooth, timing synchronization is essential to keep the transceivers aligned both in frequency and time. The Bluetooth system clock nominally runs at the half slot rate of 3200 ticks per second. The Bluetooth system clock in P1 530 also serves as a common clock to keep the audio streams in the right and left ear pieces aligned in time, thus avoiding any offset between the sound production in each ear. In some embodiments, the clock value is used as it is present at the leading frame boundary when the audio packet arrives, as a sequence identity (or time stamp) for the audio contents. The Bluetooth piconet clock covers 28 bits and at a rate of 3200 ticks per second; it takes about 23.3 hours before it wraps around. For the purpose of packet sequencing, not all bits of the Bluetooth clock are needed, but only, e.g., the 12 least significant bits (LSB), which covers a time window up to 1.28 s.

Considering the timing diagram shown in FIG. 6, ARX message 652 sent by the secondary ear piece 12s should include the 12 LSBs of the Bluetooth clock as present at the leading edge of audio packet 610. Likewise, ARX message 655 should include the 12 LSBs of the Bluetooth clock as present at the leading edge of audio packet 612. If the second audio packet would have been a retransmission as visualized by audio packet 610b in FIG. 7A, which is a retransmission of packet 610a, ARX message 652b would also include the 12 LSBs of the Bluetooth clock as present at the leading edge of audio packet 610a. Based on the ARX message, the other ear piece knows which audio packets it failed to receive and can make a direct request for a specific audio packet by including the corresponding 12 LSBs of the Bluetooth clock in the RQA message. Once the other ear piece starts to forward the missed audio information, for example using the data packets 674a-c as shown in FIG. 8, the data packets 674a-c may include the 12 LSBs of the Bluetooth clock corresponding to the clock value as present at the leading edge of the audio packet first received on piconet P1 530. Optionally, a local sequence number may be added to each data packet 674 to keep the order when sending several forwarding packets 674 over piconet P2 540 to carry one audio packet 610. When a burst of audio packets 610 arrives, the primary ear piece 12p may not have the opportunity to send ARX messages 653 via P2 since it is preoccupied on P1 530. In that case, individual ARX message corresponding to each received audio packet can be exchanged later once bandwidth on P2 540 comes available. Alternatively, a single ARX message may include information of all received audio packets since the last sent ARX message. This ARX message may then include multiple time stamps corresponding to multiple audio packets.

Figure 10:
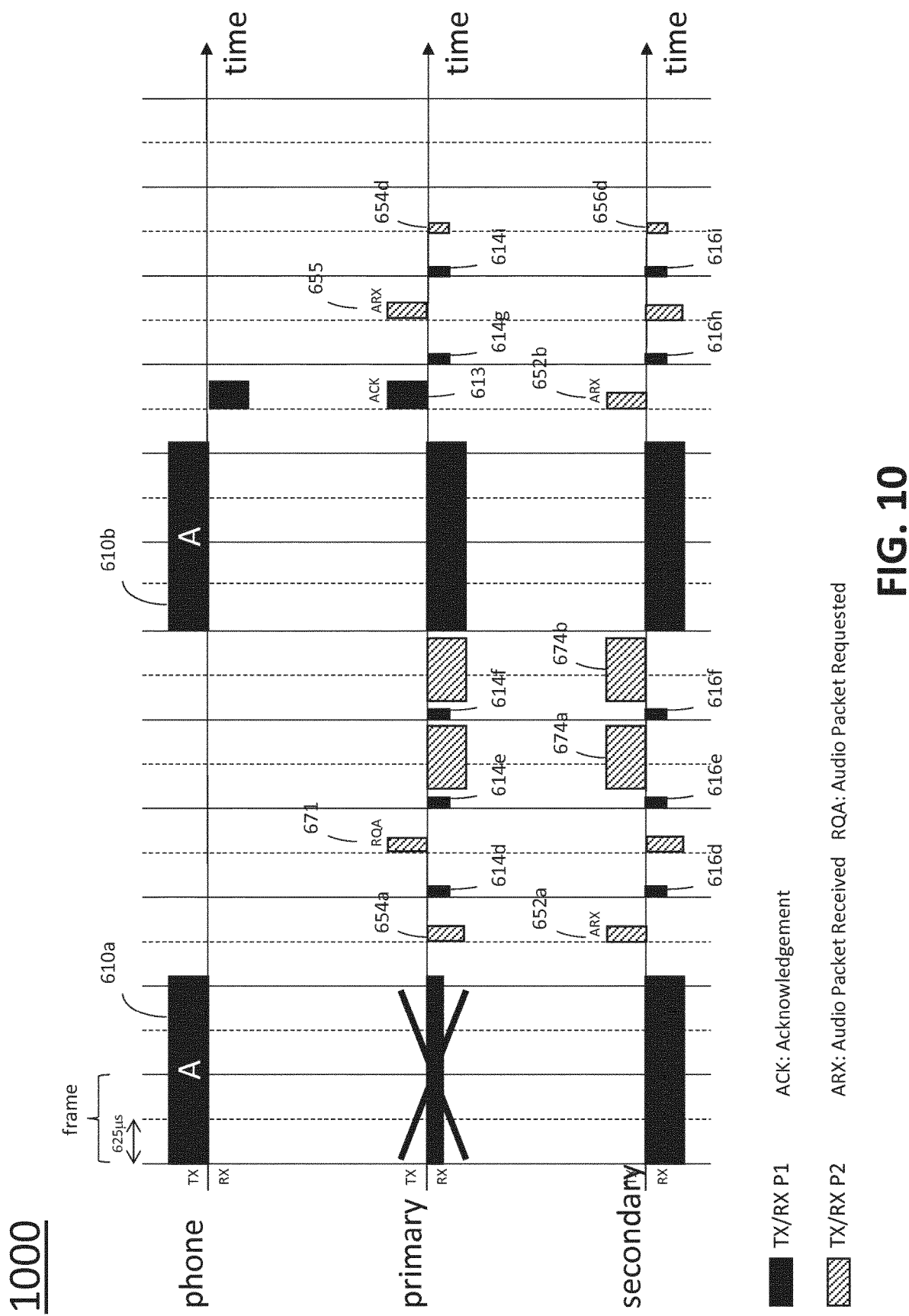
FIG. 10 is a fourth data flow and timing diagram of the first communication protocol.

In the diagram of FIG. 8, it was assumed that the smartphone 19 would directly retransmit audio packet 610 because no acknowledgement was sent by the primary ear piece 12p. However, other activities may take place in the smartphone 19, like communications on a WiFi connection, postponing the retransmission of audio packet 610. In the timing diagram 1000 of FIG. 10, it takes two additional frames before the smartphone 19 initiates a retransmission through packet 610b. In the meantime, the primary ear piece 12p may have started a diversity action by requesting the missing audio information from the secondary ear piece 12s, using request packet 671. Note that not the entire stereo audio information needs to be transferred: for the left ear piece, only the left audio channel information needs to be transferred, and for the right ear piece, only the right audio channel information needs to be transferred. Yet, if the audio information was transferred as joint stereo, the entire stereo information may need to be transferred. The secondary ear piece 12s will start the audio information transfer over the e2e link 17 using piconet P2 540 and data packets 674a, 674b. At the arrival of the retransmitted packet 610b, it will postpone the data transfer over the e2e link 17. On successful reception of the retransmitted packet 610b, primary ear piece 12p will send an ACK packet 613 on piconet P1 530. This will stop the smartphone 19 from retransmitting audio packet 610. After exchanging ARX packets to indicate the successful reception of audio information, both ear pieces 12 will turn to their low duty cycle modes, scanning piconets P1 530 and P2 540 at the beginning and middle of each frame, respectively.

In case the retransmitted packet 610b is erroneously received in the primary ear piece 12p again (not shown in a diagram), the primary ear piece 12p could still send an ACK packet 613 thus stopping the smartphone 19 from retransmitting, knowing that it can retrieve the missing audio information from the secondary ear piece 12s. It could have received all necessary audio data already in previously received packets 674a and 674b. If not, it could send a new RQA packet on piconet P2 540 after the ACK packet 613 in order to continue the transfer of the missing audio information over the e2e link 17 (i.e., packet 674c, 674d, not shown).

In the scenarios discussed so far, failures on piconet P1 530 resulted in erroneous packet reception, i.e., the audio packet was discarded because of errors in the payload, but the preamble and header were received correctly. This meant that the receiver knew that a packet had arrived, and knew its timing and length (or at least how many time slots it occupied as can be derived from the packet type information in the header 420), but was unable to use the audio information in the payload. In the following, cases are considered when a packet is missed by the receiver, i.e., the receiver does not know a packet has arrived, and is not aware of any timing information. Such a case is shown in the timing diagram 1100 of FIG. 11A, where the primary ear piece 12p misses the arrival of packet 610a. It will just continue to alternatively scan piconets P1 and P2. A missed packet, as opposed to one erroneously received, is indicated in the figures by an "X" over the indications of the relevant ear piece scanning piconets P1 and P2. Note that this indicated a missed packet only for the indicated ear piece—the other ear piece may (or may not) have received the packet correctly.

In the case depicted, the primary ear piece 12p will be notified that it has missed an audio packet by the ARX packet 652a sent by the secondary ear piece 12s on piconet P2 540. Since the smartphone 19 does not receive an ACK packet, it may retransmit audio packet 610b. Depending on the reception of this packet 610b by primary ear piece 12p, different actions may be taken.

Figure 11A:
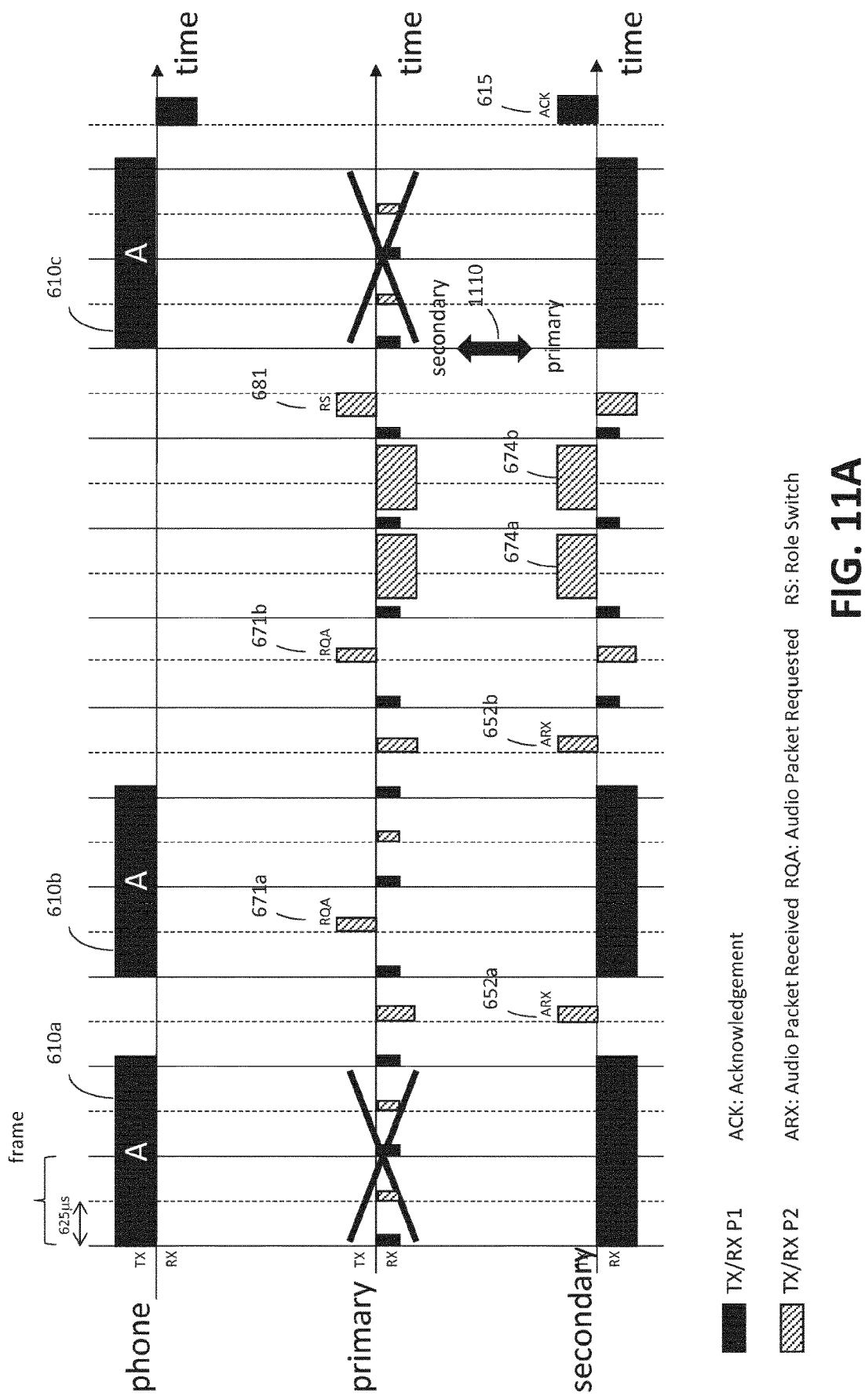
FIG. 11A is a fifth data flow and timing diagram of the first communication protocol.

If audio packet 610b is received successfully by primary ear piece 12a, it will just send an ACK packet 613 and process the audio information. However, if the retransmitted packet is received erroneously, it may still send an ACK packet and subsequently start a diversity action, requesting the missing audio information from the secondary ear piece 12s, i.e., by sending an RQA packet 671 similarly as described by the timing diagram shown in FIG. 8. In contrast, if audio packet 610b is missed as well, it will start a diversity action by requesting the missing audio information using RQA message 671a as is shown in FIG. 11A. It may take some time before the RQA message 671a-b receives the secondary ear piece 12s since the secondary ear piece 12s may be preoccupied with receiving the retransmission 610b. On receipt of RQA 617b, the secondary ear piece 12s may transfer the missing audio data to primary ear piece 12p using piconet P2 540 through data packets 674a and 674b.

Since the primary ear piece 12p has now missed two audio packets in a row (as it deduced from the ARX packets 652a-b sent by secondary ear piece 12s), it may decide it is no longer fit for being the primary ear piece (more than two consecutive missed packets may be necessary before this decision is reliably made). When packets are missed, the primary ear piece 12p does not know when to send an ACK to the phone 19 and retransmissions may continue from the phone 19. Therefore, the primary ear piece 12p may send a Role-Switch (RS) packet 681 to the secondary ear piece 12s to switch their roles. At instance 1110, the switch takes place, making, e.g., the left ear piece 12b the primary ear piece 12p and the right ear piece 12a the secondary ear piece 12s. From then on, the new primary ear piece 12p will send ACK packets to the smartphone 19, as shown by packet 615 in response to audio packet 610c.

Figure 11B:
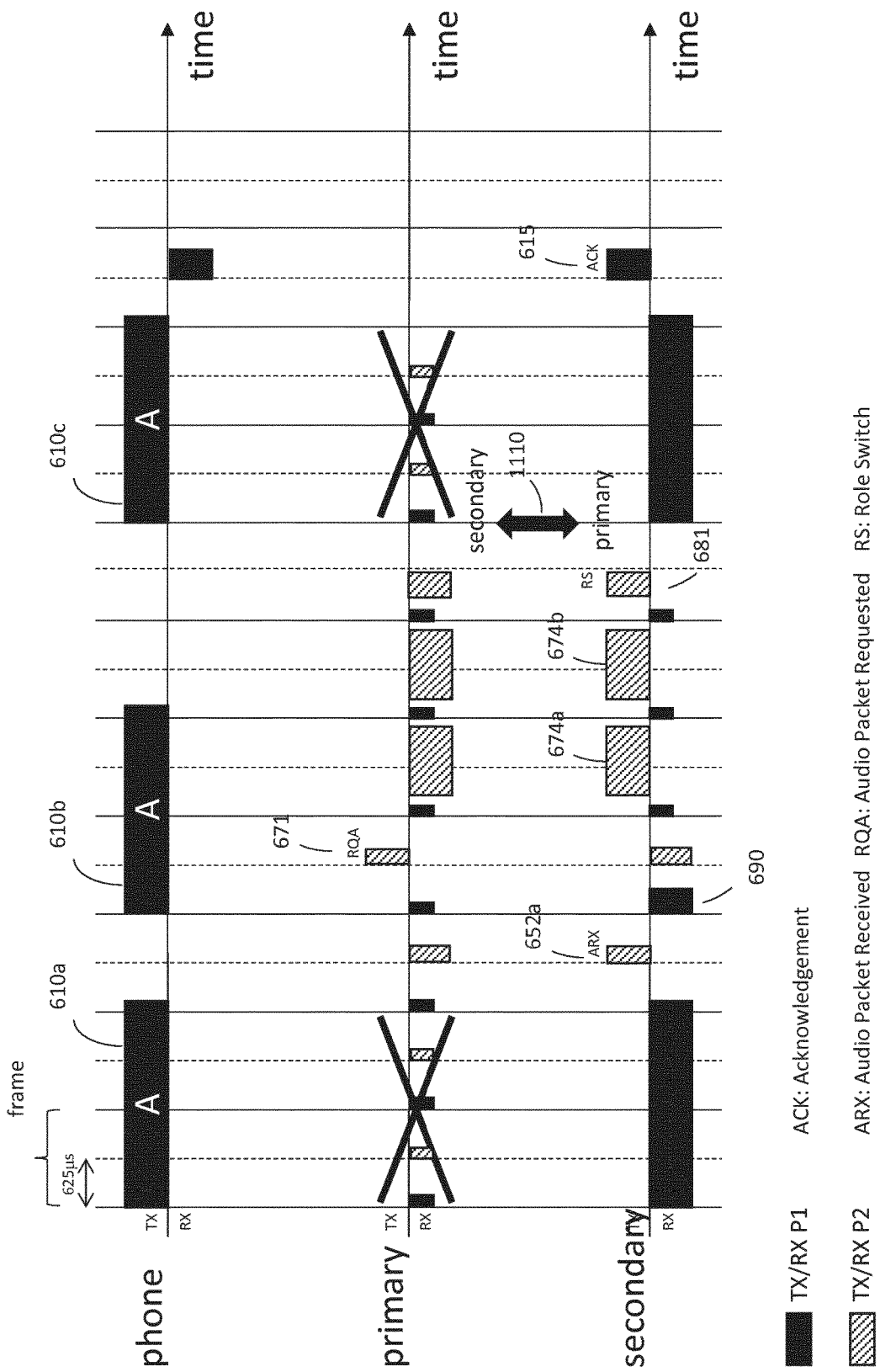
FIG. 11B is an alternative embodiment of FIG. 11A.

In an alternative embodiment, depicted in FIG. 11B, on receiving the header of the retransmitted packet 610b at 690, the secondary ear piece 12s will recognize this to be a retransmission (deduced from the sequence number in the header of audio packet 610b). It will immediately abort reception on P1 and listen to P2 instead. RQA 671 sent by the primary ear piece 12p will then be received by the secondary ear piece 12s and the forwarding from the secondary ear piece 12s to the primary ear piece 12p, via packets 674a and 674b, will begin. Since the secondary ear piece 12s has not received ARX messages from primary 12p, it is aware of the bad connection from phone 19 to primary ear piece 12p. Therefore, it can initiate a Role-Switch (RS) by sending packet 681.

Figure 12:
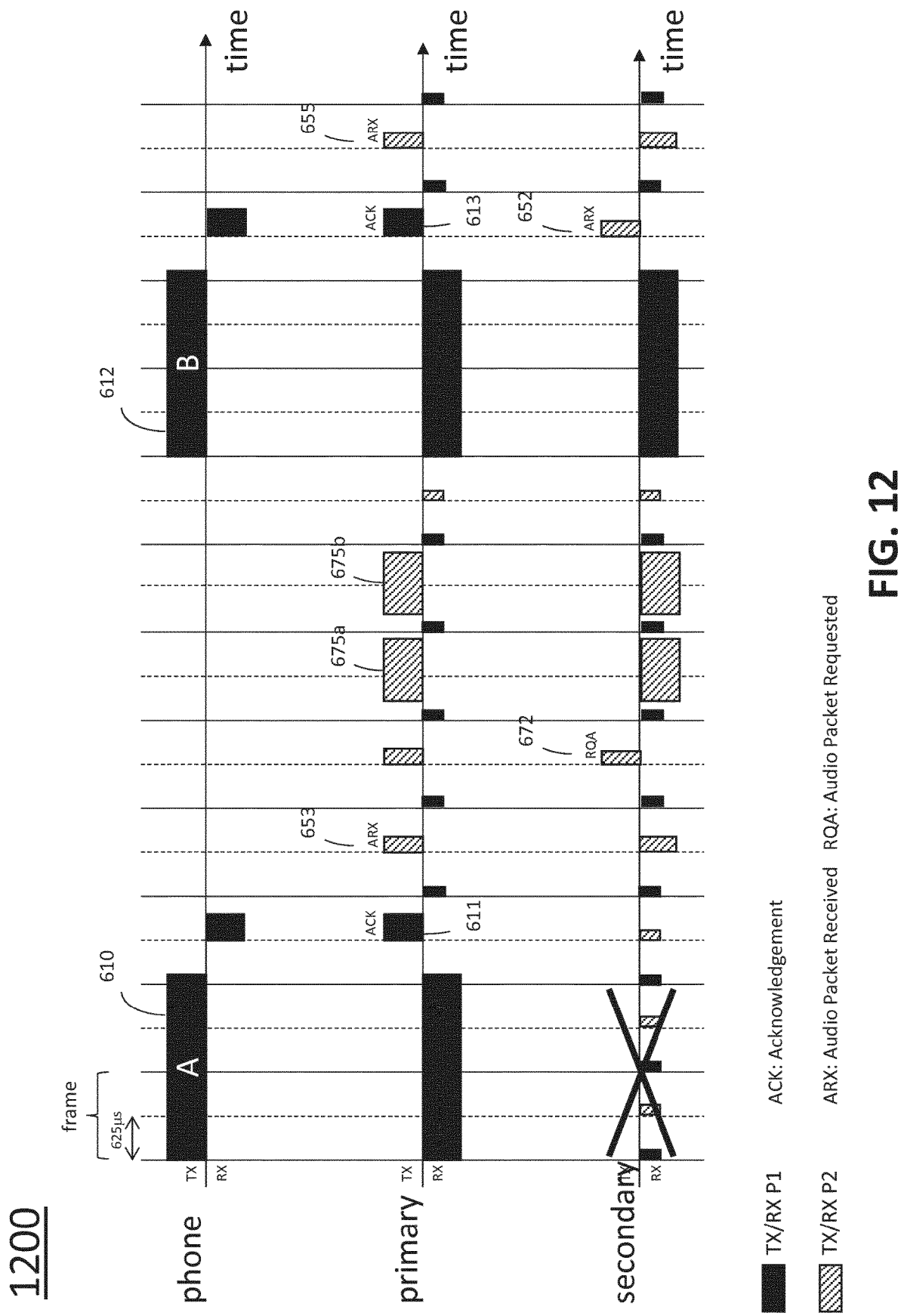
FIG. 12 is a sixth data flow and timing diagram of the first communication protocol.

Previous diagrams have shown the courses of action in the diversity scheme when the packet reception in the primary ear piece 12p fails due to bit errors in the packet or missing of the packet arrival. Next, the case of reception of failures in the secondary ear piece 12s is discussed. In the data flow and timing diagram 1200 of FIG. 12, the secondary ear piece 12s misses the audio packet 610. However, it is informed by the ARX packet 653 sent by the primary ear piece 12p on P2 540 that an audio packet was missed and that the audio information resides in the primary ear piece 12p. The secondary ear piece 12s will subsequently send an RQA packet 672 on piconet P2 540 in order to retrieve the missing audio data from the primary ear piece 12p. The primary ear piece 12p sends the audio data intended for the secondary ear piece 12s over piconet P2 540 using packets 675a and 675b. If audio packet 610 was not missed but received erroneously, the secondary ear piece 12s could follow the same course of action. However, since in this case it knows the timing of audio packet 610, it knows that an ACK will be sent after the end of audio packet 610. It could therefore listen on piconet P1 530 just after packet 610 has finalized to check whether the primary ear piece has received the audio packet 610 and confirms this to smartphone 19 via ACK 611. This would be a redundant confirmation to the secondary ear piece 12s, in addition to the indication carried by ARX packet 653.

Figure 13:
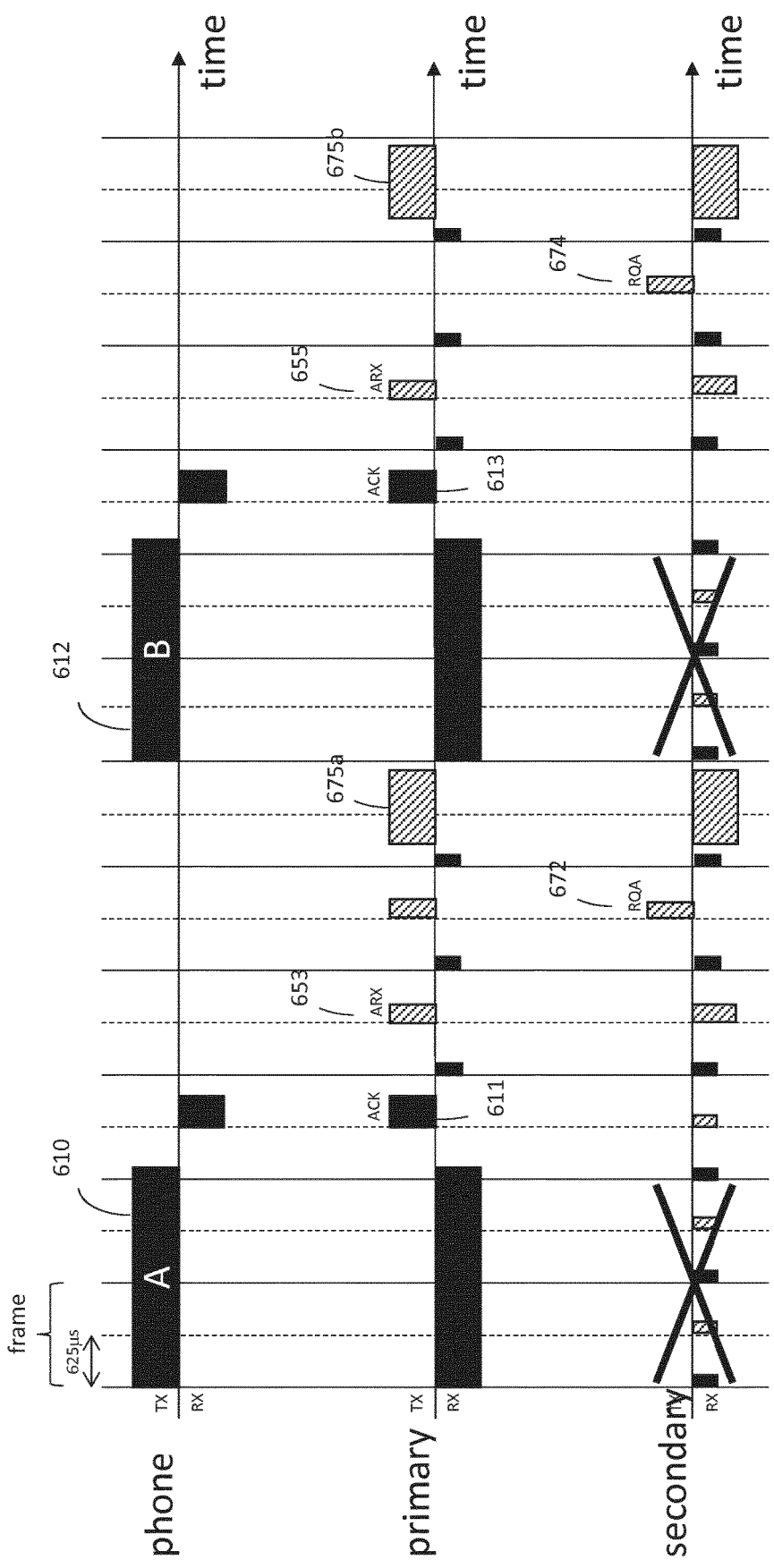
FIG. 13 is a seventh data flow and timing diagram of the first communication protocol.

In the data flow and timing diagram 1300 shown in FIG. 13, a new audio packet 612 arrives before the complete missed audio information has been transferred from the primary ear piece 12p to the secondary ear piece 12s. The transfer via the e2e link 17 will continue after the reception of packet 612 has been handled, first with a new request packet 674 from the secondary ear piece 12s and transfer of subsequent audio information 675b. Packet 612 may have been missed or erroneously received by secondary ear piece 12s as well. The secondary ear piece 12s will continue to request additional audio information via e2e link 17 until all data has arrived correctly at the secondary ear piece 12s.

In the previous description, it was assumed that piconet P1 530 is based on the Bluetooth® Classic specification using the 2 Mb/s Enhanced Data Rate mode. Other modes could be used, such as the 1 Mb/s Basic Rate mode, or the 3 Mb/s Enhanced Data Rate mode. Secondly, an audio mode based on Bluetooth® Low Energy can be used, possibly using the (more robust) Long Range mode defined in Bluetooth® Low Energy. Thirdly, another standard different from Bluetooth® can be used, for example ANT, WiFi® or ZigBee®, or another system based on IEEE 802.15.4. Finally, a proprietary RF technology can be used. Similar RF technologies as listed above can be applied for piconet P2 540. Moreover, piconet P1 530 and piconet P2 540 may use different RF technologies. Preferably, the same radio component 250 can be used, but even that is not necessary. If piconets P1 and P2 would use different operating bands and/or bandwidths, two separate radio components would be needed to support the two different piconets.

The embodiments described above used a radio technology for the e2e link 17 between the right and left ear pieces 12, reusing the Bluetooth radio receivers 520 that are used to send information back and forth between the ear pieces 12 and the host device 19. In another embodiment, the e2e link is based on magnetic coupling, for example based on a Near Field Magnetic Induction (NFMI) technology. In FIG. 2, this means that transceivers 270a and 270b use NFMI components, for example the N×H2280 fully integrated chip solution, available from NXP Semiconductors of Eindhoven, Netherlands. In this case, piconet P2 540 in FIG. 5 is based on NFMI technology. Since magnetic induction technology used in piconet P2 540 operates at a much lower carrier frequency (such as 10 MHz) than the RF technology used in piconet P1 530, there is no mutual interference.

Figure 14:
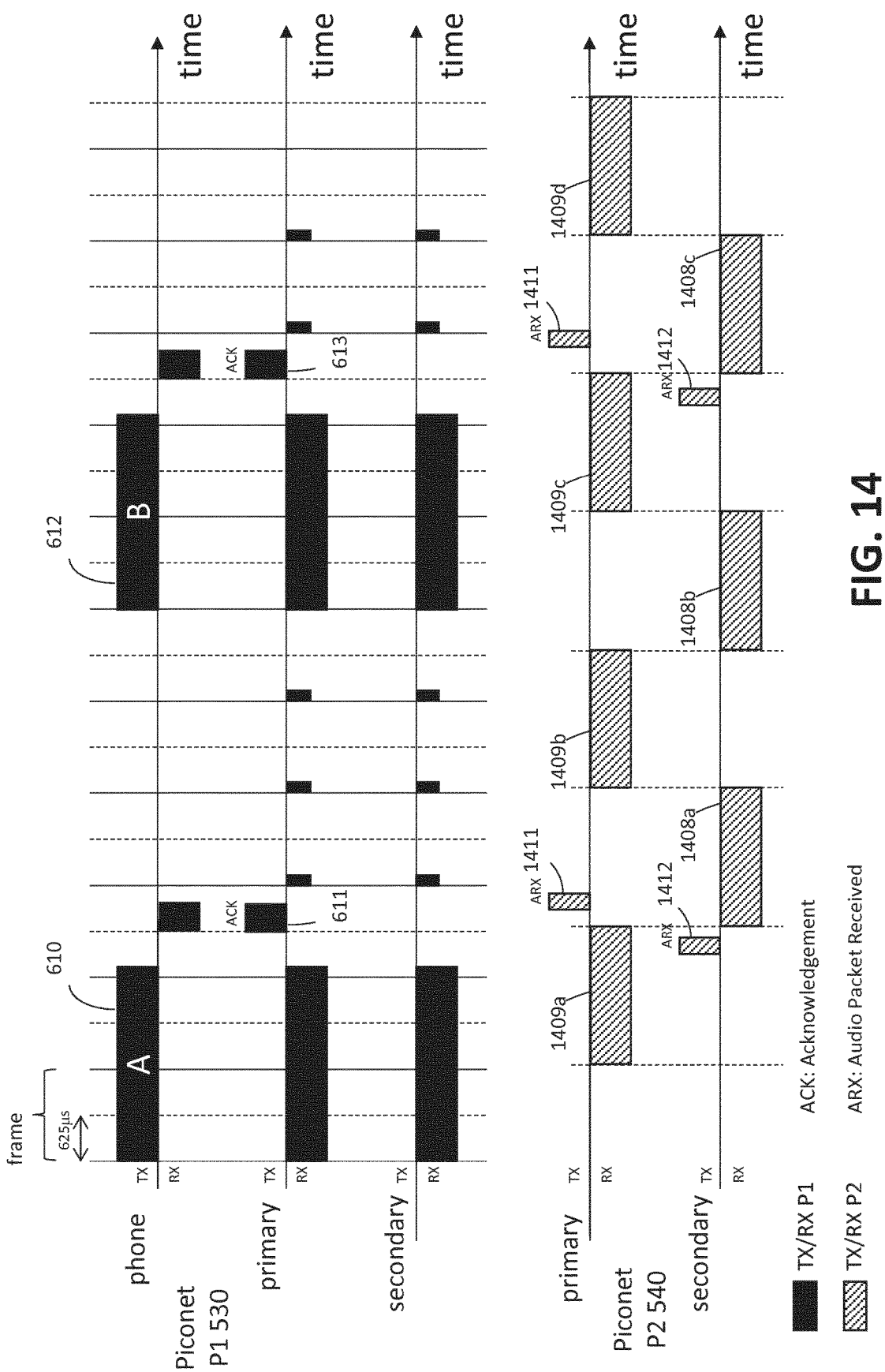
FIG. 14 is a first data flow and timing diagram of a second communication protocol.

Furthermore, in each ear piece 12, separate transceivers are used to support communications in piconet P1 530 (transceiver 250) and piconet P2 540 (transceiver 270). As a result, timing alignment considerations as applied in the RF embodiments are not necessary, i.e., transmission and reception in piconets P1 and P2 can occur in parallel, simultaneously. However, the protocol carried over e2e link 17 can be very similar as will be visualized in the diagram 1400 shown in FIG. 14. Piconet P1 530 handles the traffic between the smartphone 19 and the primary and secondary ear pieces 12p, 12s. On successful arrival of Bluetooth audio packets 610 and 612, the primary ear piece 12p returns Bluetooth ACK packets 611 and 613, respectively. The secondary ear piece 12s merely listens on piconet P1 530. Piconet P2 540 now is the NFMI wireless interface, which may have a completely different timing, unrelated to piconet P1 530.

In this example, NFMI transceiver 270 located in the primary ear piece 12p periodically listens to the NFMI transceiver 270 located in the secondary ear piece 12s during receive windows 1409a-d. Likewise, NFMI transceiver 270 located in the secondary ear piece 12s periodically listens to the NFMI transceiver 270 located in the primary ear piece 12p during receive windows 1408a-c. As soon as the primary ear piece 12p receives a successful audio packet, it will send an ARX packet 1411 over piconet P2 540 to the secondary ear piece 12s during the first available receive window 1408 of the secondary ear piece 12s. In a similar fashion, as soon as secondary ear piece 12s receives a successful audio packet, it will send an ARX packet 1412 over piconet P2 540 to the primary ear piece 12p during the first available receive window 1409 of the primary ear piece 12p. Since in the example of FIG. 14 no packets fail, no further action taken is on the piconet P2 540.

Figure 15:
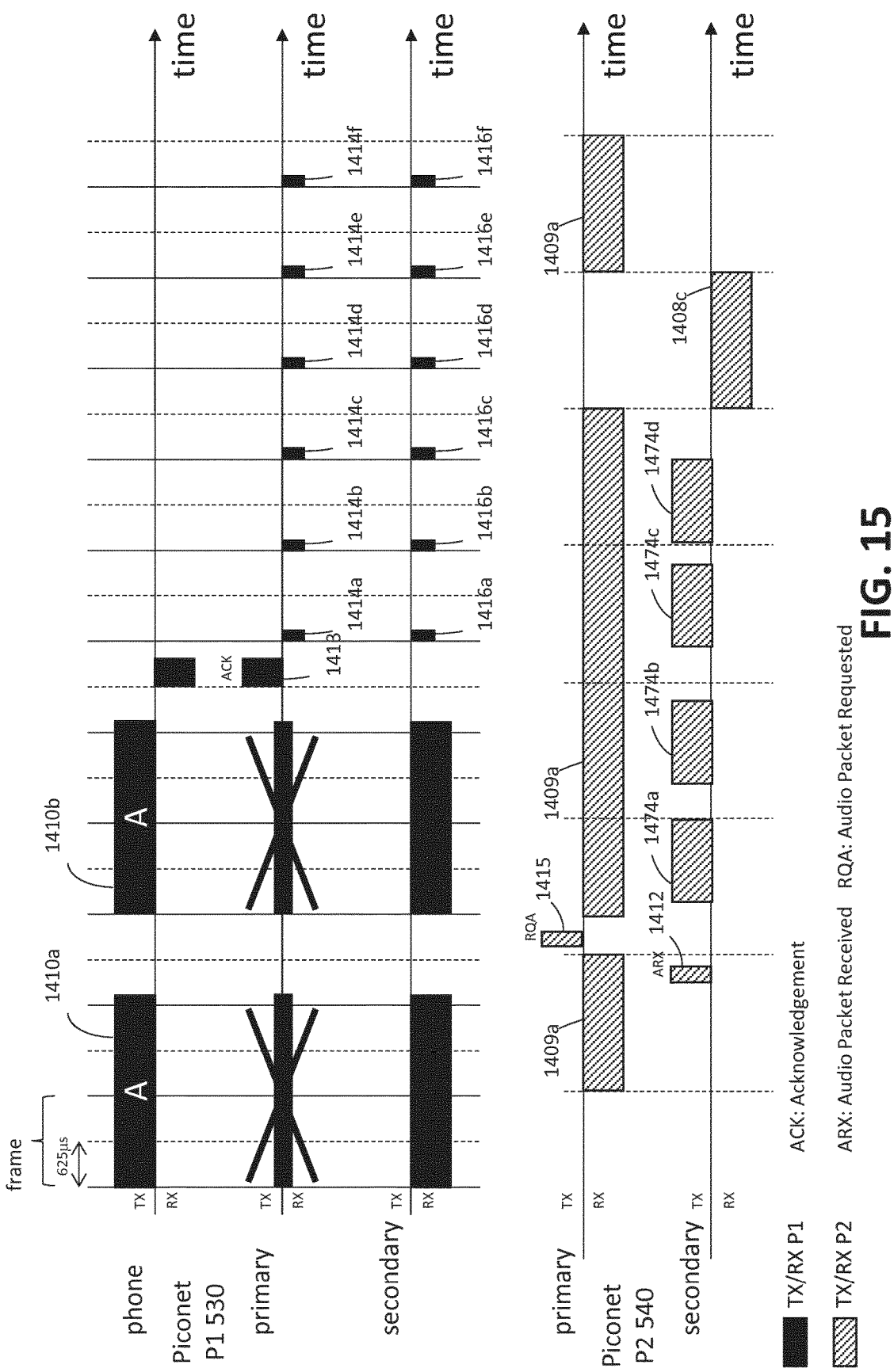
FIG. 15 is a second data flow and timing diagram of the second communication protocol.

This is different in the situation shown in timing diagram 1500 of FIG. 15. Bluetooth Audio packet 1410a sent by the smartphone 19 on piconet P1 530 is received erroneously by the primary ear piece 12p. Since secondary ear piece 12s has received the Bluetooth audio packet successfully on piconet P1 530, it will send an ARX packet 1412 on piconet P2 540. Since the primary ear piece 12p is now aware it is missing audio information, it will send a request for audio using RQA packet 1415 on piconet P2 540. It will then open its receiver to receive the data packets 1474a-d sent by the secondary ear piece 12s containing the requested audio data. On piconet P2 540, an ARQ scheme can be added wherein each data packet is acknowledged by the receiver (not shown).

The smartphone 19 will start a retransmission on piconet P1 530 since no Bluetooth ACK packet was received. Irrespective of whether the retransmitted packet 1410b is received successfully or not, the primary ear piece 12p will return an ACK packet 1413 to stop the smartphone 19 from further retransmissions. In the example of FIG. 15, the retransmission fails as well. However, the missing audio information is provided to the primary ear piece 12p by the secondary ear piece 12s via piconet P2 540. It will be understood to those of skill in the art that the other packet failure scenarios as described for the RF embodiments in FIGS. 8-13 are applicable to this NFMI embodiment as well. The same commands and data flow can be used, albeit with different timing and data protocol. Also note, that analogous to the situation in FIG. 7B, a fast implementation will allow the primary ear piece 12p to send an ACK 1413 to the phone 19 directly after the (erroneous) reception of packet 1410, thus preventing retransmission 1410b altogether.

In yet another embodiment, the e2e link 17 is not wireless but wired. The e2e transceivers 270a and 270b shown in FIG. 2 are modems, preferably sending digital signals over a wire or a cable. The wire can be used to provide diversity just as described with respect to the RF and NFMI embodiments described above. Moreover, since the signals over the wire, now representing piconet P2 540, will not interfere with the RF signals used in piconet P1 530, communications occurring in P1 530 and P2 540 can take place simultaneously. In this respect, the wired embodiment is similar to the NFMI embodiment. In fact, the data flow and timing diagrams shown in FIGS. 14 and 15 also apply for the wired embodiment.

Figure 16:
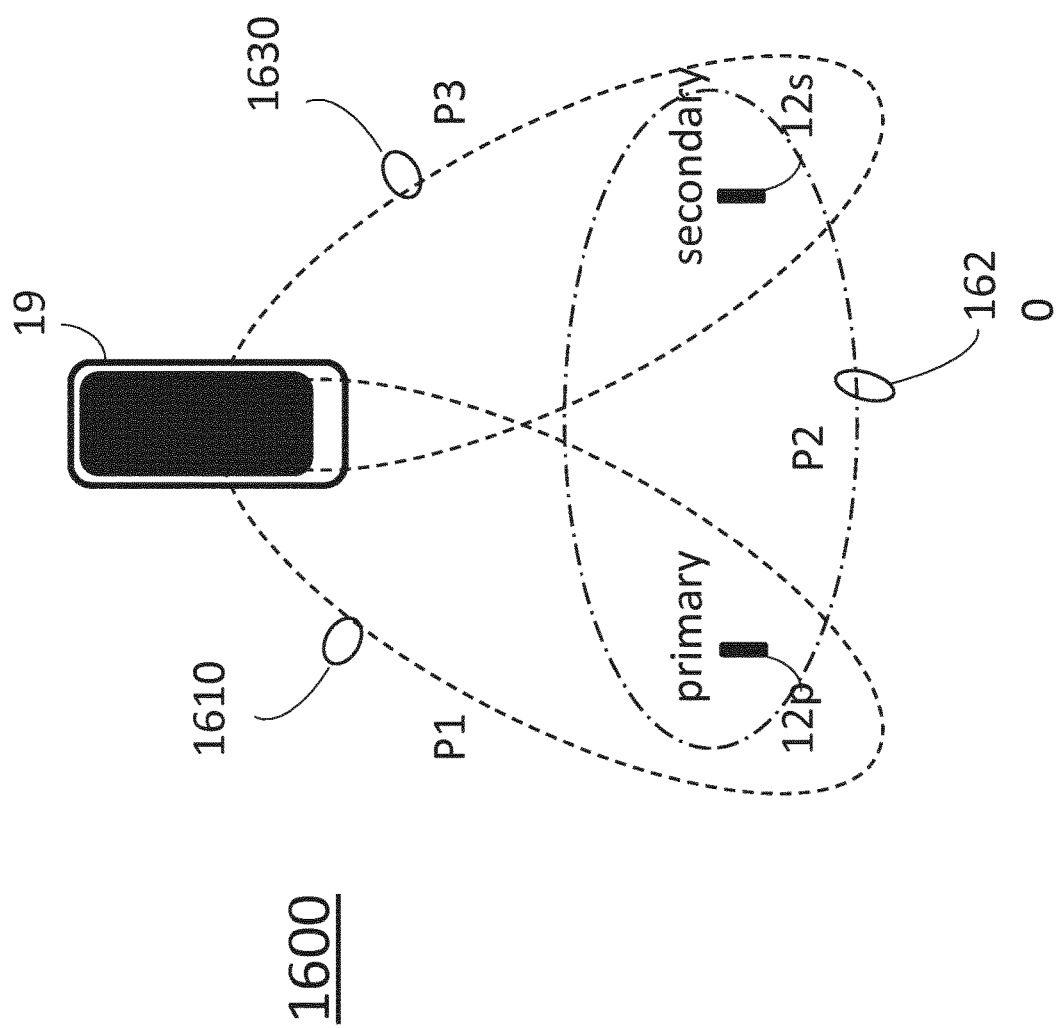
FIG. 16 shows three Bluetooth piconets.

In FIG. 16, another embodiment is shown. To support the configuration 1600 of FIG. 16, either the circuit diagram shown in FIG. 2 or FIG. 3 can be used. In contrast to the configuration shown in FIG. 5, FIG. 16 depicts an embodiment in which three piconets are active. A first piconet P1 1610 connects the smartphone 16 and the primary ear piece 12p, similar to the piconet P1 530 of FIG. 5. A second piconet P2 1620 provides an e2e channel connecting the primary and secondary ear pieces 12p. 12s, similar to the piconet P2 540 of FIG. 5. New to the embodiment of FIG.

16 is a third piconet P3 1630, connecting the smartphone 16 with the secondary ear piece 12s. That is, in the configuration shown in FIG. 16, the phone 19 serves the primary and secondary ear pieces 12p, 12s with two separate piconets P1 and P3. In embodiments in which the piconets P1, P3 are implemented with Bluetooth, each has its own frequency hop pattern, addresses, and possibly access codes. In this embodiment, the secondary ear piece 12s no longer "listens in" and receives packets sent on piconet P1 1610, which are intended for the primary ear piece 12p. Nor can the secondary ear piece 12s receive packets sent by primary ear piece 12p on piconet P1 1610, intended for the smartphone 19. In other words, ear pieces 12p and 12s can only communicate via the e2e link formed by piconet P2 1620. For those skilled in the art, it will be clear that P1 1610 and P3 1630 can also represent different channels in the same piconet. For example, P1 and P3 can be separate ACL channels in a Bluetooth Classic piconet, each with its own Logical Transport Address (LT_ADDR). Alternatively, P1 and P3 can be different physical channels as defined in Bluetooth Low Energy, each with its own hopping sequence and access address.

In order for the diversity concept to operate in this configuration, the same left and right audio information is sent on both links P1 and P3 to ear piece 12p and ear piece 12s. Since both left and right audio information is present in each ear piece 12p, 12s, one ear piece can forward the proper audio information via the e2e link P2 to the other ear piece in case the latter ear piece misses the audio information and requests a forwarding. As discussed above, the P2 link can be either a radio link, for example based on Bluetooth; a magnetic link, for example based on NFMI; or a wired link.

Figure 17:
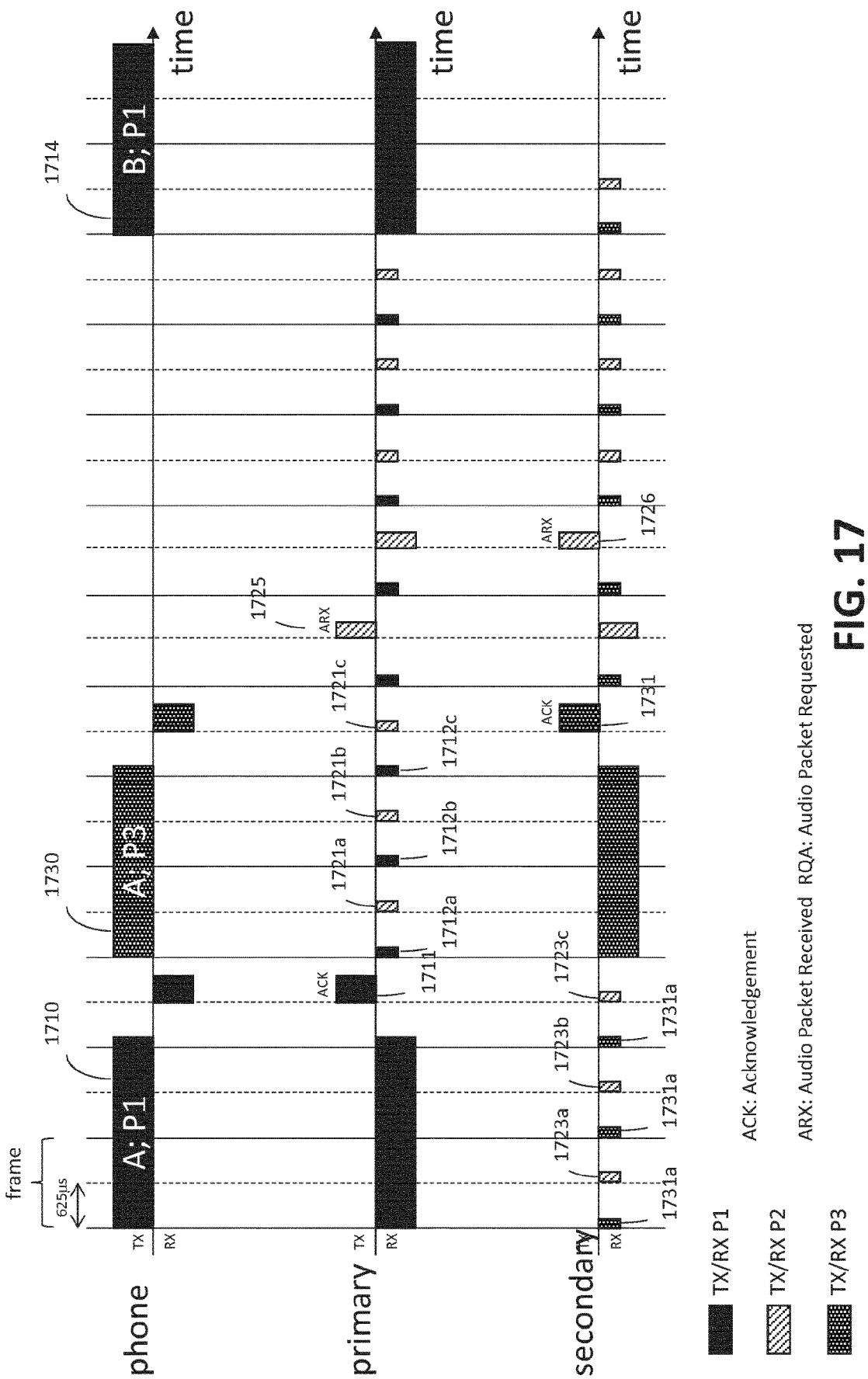
FIG. 17 is a first data flow and timing diagram of a third communication protocol.

FIG. 17 shows a first data flow and timing diagram 1700 of a communication protocol providing diversity in the 3-piconet embodiment of FIG. 16. In this first diagram, no packet failures are experienced on the links. The smartphone 19 first sends packet A 1710 on piconet P1 1610 towards the primary ear piece 12p, for example the right ear piece 12a. This packet 1710 contains both the left and right audio information. The primary ear piece 12p will only use the right audio information intended for the right ear, and will produce an audible sound in the right speaker 210a. The left audio information is (temporarily) stored in the ear piece 12a for later use. After receiving the packet 1710 correctly, primary ear piece 12p returns an ACK packet 1711 on P1 1610 to inform the smartphone 19 of a successful reception.

In the meantime, secondary ear piece 12s (in this case the left ear piece 12b) alternatively listens on piconet P3 1630 (listening instances 1731a, 1731b, etc.) and on piconet P2 1620 (listening instances 1723a, 1723b, etc.) for packets sent by the smartphone 19 or the primary ear piece 12p, respectively. The secondary ear piece 12s listens on P3 1630 at the start of the frames, i.e., even slots (assuming the smartphone 19 is the master on the P3 connection) and listens on the odd slots on P2 1620. After the transmission of packet 1710 to the primary ear piece 12p, the smartphone 19 sends a packet 1730 with the same (left and right) audio information on piconet P3 1630 to the secondary ear piece 12s. The secondary ear piece 12s will only use the left audio information intended for the left ear to produce an audible sound in the left speaker 210b. The right audio information is (temporarily) stored in the ear piece 12b for later use. After receiving the packet 1730 correctly, the secondary ear piece 12s returns an ACK packet 1731 to inform the smartphone 19 of a successful reception.

In the meantime, the primary ear piece 12p alternatively listens on piconet P1 1610 (listening instances 1721a, 1721b, etc.) and on piconet P2 1620 (listening instances 1712a, 1712b, etc.) for packets sent by the smartphone 19 and the secondary ear piece 12s, respectively. After the audio packets have been received and acknowledgements have been returned, the primary ear piece sends an ARX packet 1725 on piconet P2 1620 and secondary ear piece sends an ARX packet 1726 on piconet P2 1620, to let each other know that audio information has been received correctly. Since there were no errors, no further action is taken. The primary ear piece 12p will listen alternatively on P1 and P2, and the secondary ear piece 12s will listen alternatively on P3 and P2, until the next audio packet from the smartphone 19 arrives (for example 1714).

Figure 18:
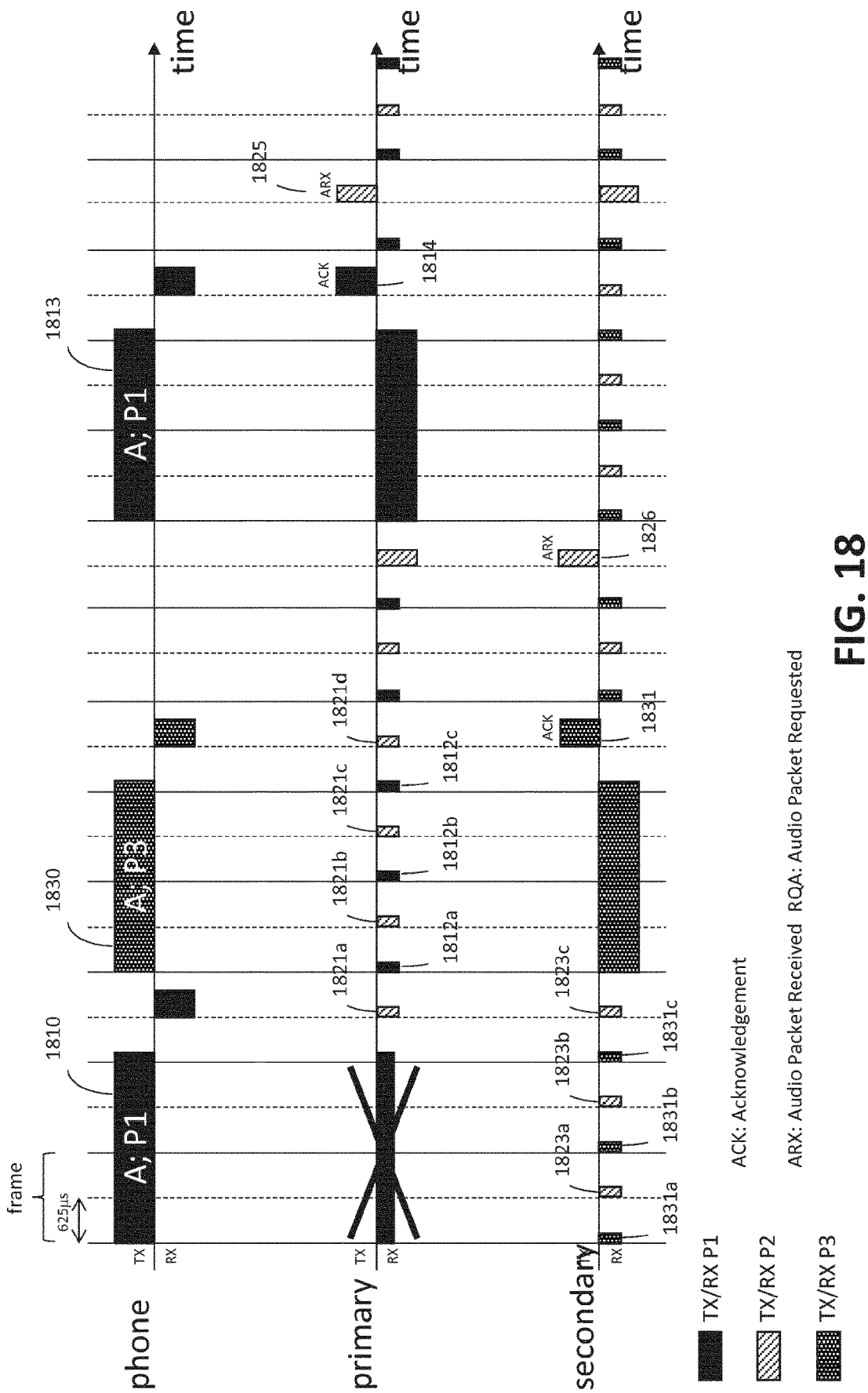
FIG. 18 is a second data flow and timing diagram of the third communication protocol.

FIG. 18 shows a second data flow and timing diagram 1800 of a communication protocol providing diversity in the 3-piconet embodiment of FIG. 16. In this case, the packet 1810 sent by the smartphone 19 over P1 1610 and intended for the primary ear piece 12p is missed. No ACK is sent. The smartphone 19 continues by sending packet 1830 to the secondary ear piece 12s over P3 1630. This transmission is successfully received and acknowledged by the secondary ear piece 12s by sending ACK packet 1831 over P3 1630. Since the audio information was not received in the primary ear piece 12a, this ear piece will not send an ARX packet over P2 1620. On the other hand, the secondary ear piece 12s received the audio correctly, and consequently sends an ARX packet 1826 over P2 1620 to the primary ear piece 12p. Since the smartphone 19 did not receive an ACK for the packet sent on P1 1610 to the primary ear piece 12p, it will retransmit the audio data in packet 1813. On successful reception, the primary ear piece 12p will return an ACK packet 1814 on P1 1610. However, since the primary ear piece 12p has been informed by secondary ear piece 12s that the latter ear piece has the right audio data available, even if the reception of packet 1813 is erroneous or missed, the primary ear piece 12p can send an ACK packet on P1 1610 with the knowledge that it can retrieve the right audio information from the secondary ear piece 12s. Alternatively, the retransmission 1813 of the audio packet on P1 may be omitted all together. Since the secondary ear piece 12s has acknowledged the successful reception of the audio data via ACK packet 1831, the phone 19 knows that the audio data is present in at least one of the ear pieces (i.e. the secondary ear piece 12s in this example). It can therefore expect that the primary ear piece 12p will retrieve the missing audio data from the secondary ear piece 12s and therefore does not have to retransmit audio packet A 1813 on P1.

Figure 19:
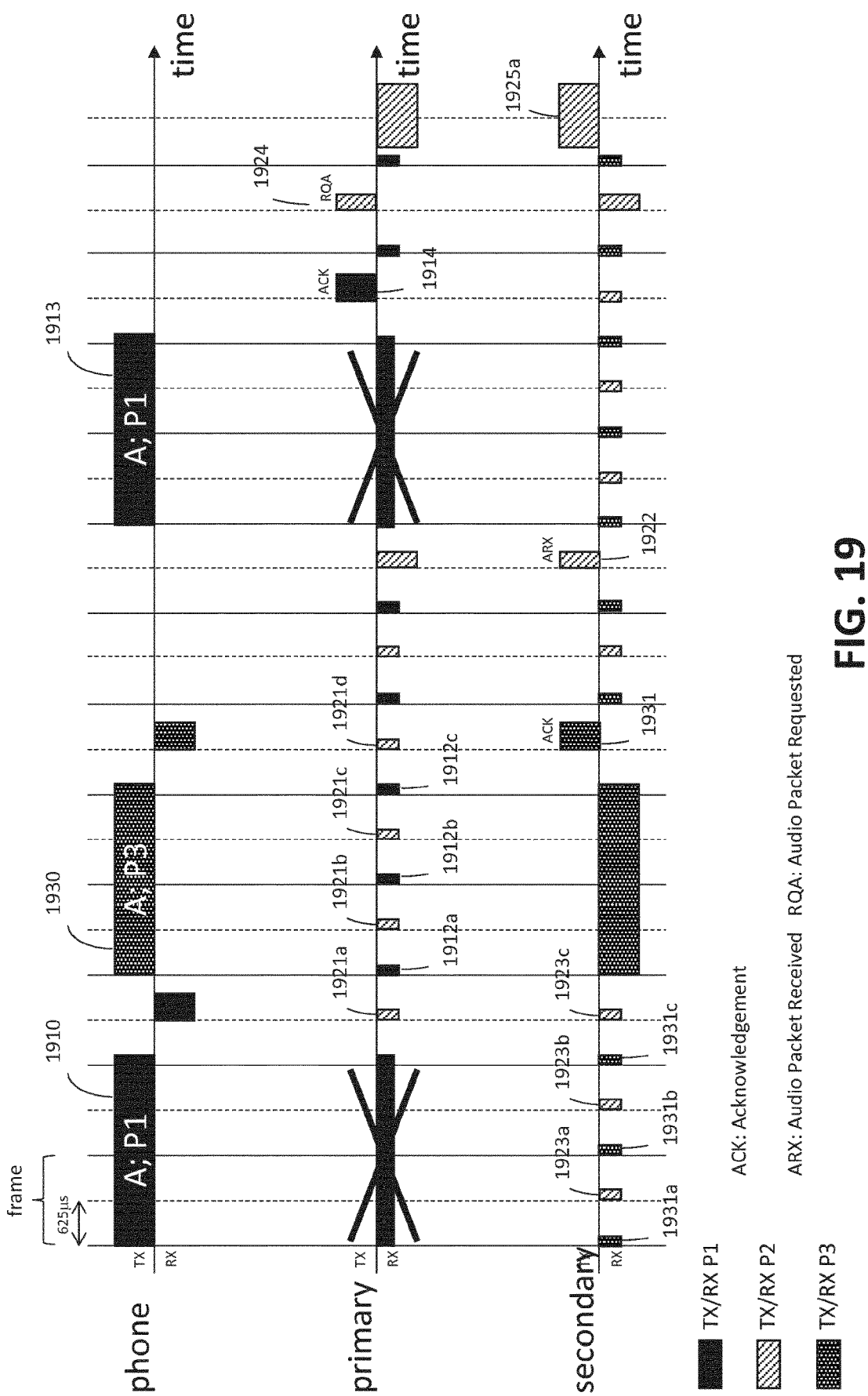
FIG. 19 is a third data flow and timing diagram of the third communication protocol.

Forwarding missed audio data from the secondary ear piece 12s to the primary ear piece 12p is visualized in the timing diagram 1900 of FIG. 19. After the ACK packet 1914 has been sent on P1 1610, the primary ear piece 12p sends a RQA packet 1924 on P2 1620 to request the right information from the secondary ear piece 12s. The secondary ear piece 12s will subsequently start to send the right audio information to the primary ear piece 12p using packet(s) 1925a over P2 1620. Note that at the beginning of each frame, both the primary and secondary ear pieces 12p, 12s listen on P1 1610 and P3 1630, respectively, in order to ascertain if the smartphone 19 is sending a new packet. Sending an ACK 1914 by the primary ear piece 12p even if the right audio information has not arrived yet, stops the smartphone 19 from resending the same audio packet repeatedly (if the link via P1 1610 is very bad, for example caused by body effects) and thus reducing traffic and power consumption in the smartphone 19.

Figure 20:
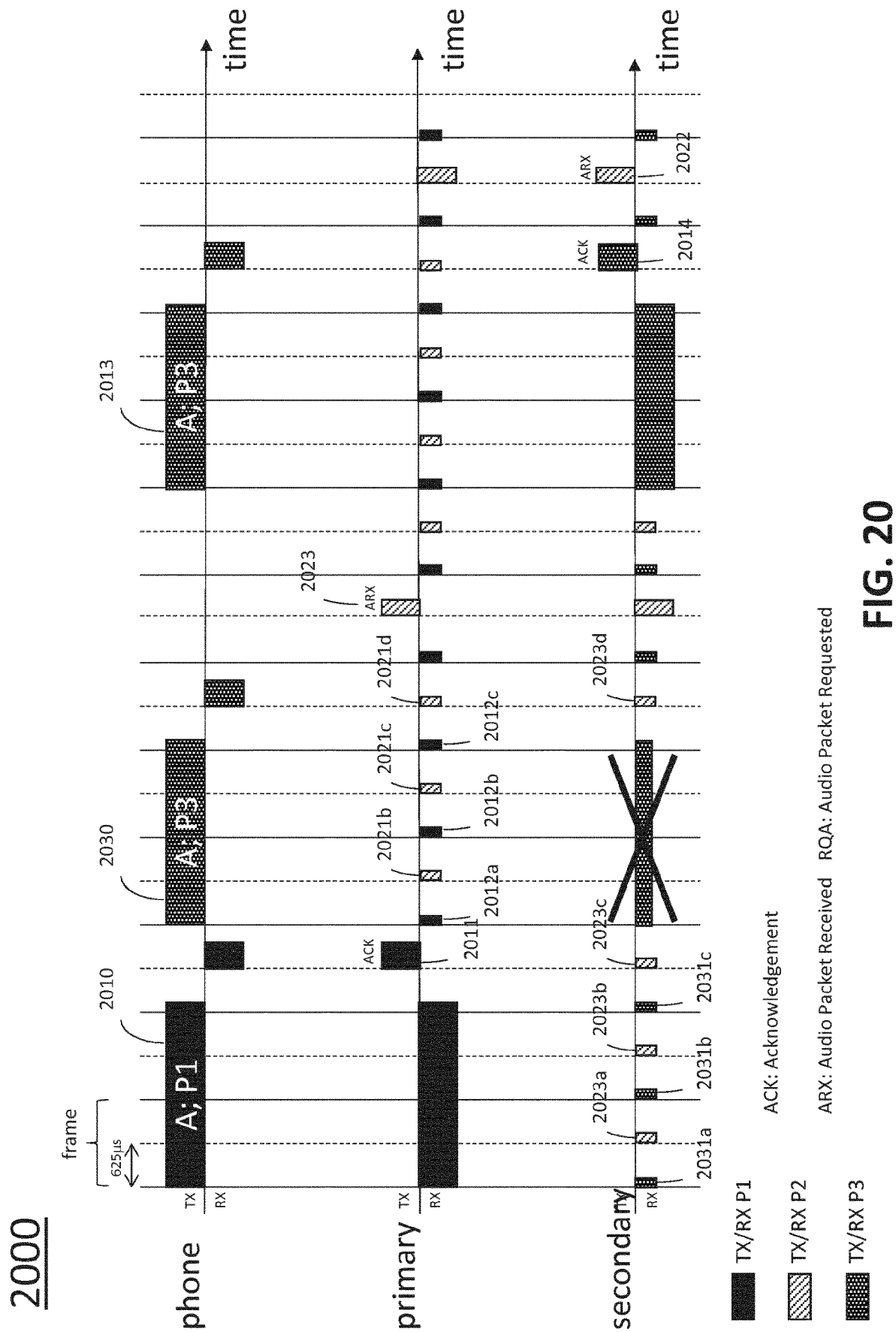
FIG. 20 is a fourth data flow and timing diagram of the third communication protocol.
Figure 21:
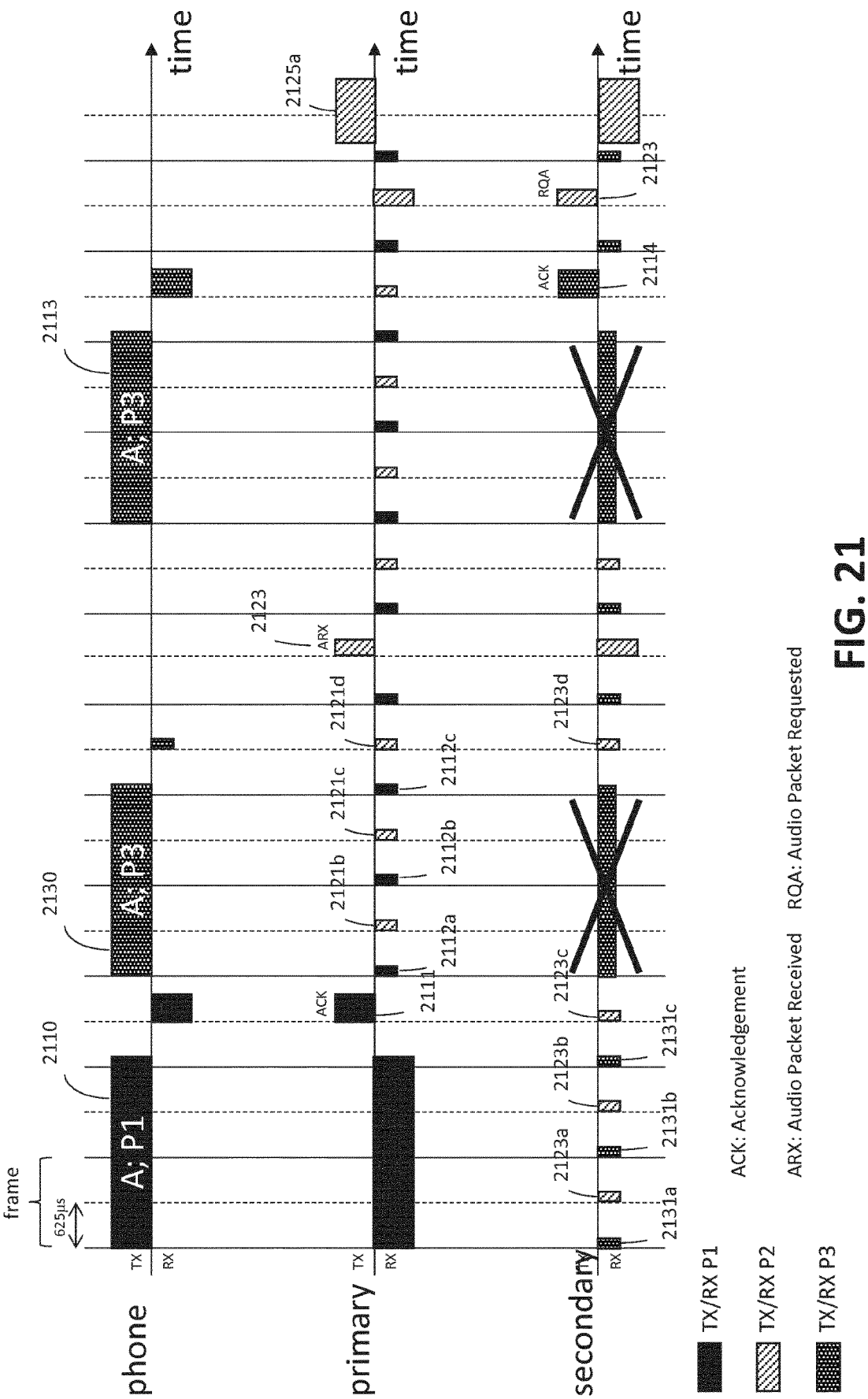
FIG. 21 is a fifth data flow and timing diagram of the third communication protocol.

In diagrams 2000 and 2100 of FIGS. 20 and 21, similar situations as described above are shown, but now the secondary ear piece 12s receives the packet transmission erroneously once or twice. The transmission on P1 1610 to the primary ear piece 12p is successful, and the primary ear piece 12p via e2e link P2 1620 informs the secondary ear piece 12s that left audio information is present in the primary ear piece 12p, using ARX packet 2023/2123. If the retransmission from the smartphone 19 to the secondary ear piece 12s is erroneously received as well (FIG. 21), the secondary ear piece 12s will send an ACK 2114 to the smartphone 19, and will subsequently request the left audio information from ear piece 12p using RQA packet 2123 to initiate the forwarding, by packet 2125a, by the primary ear piece 12p. Although a retransmission 2113 on P3 is shown, initiated by the absence of an ACK after 2130, this retransmission can be omitted. Since the phone 19 received and ACK 2111 on P1, it knows that at least one of the ear pieces, in this case the primary ear piece 12p, has received the audio correctly. It can therefore deduce that the secondary ear piece 12s will retrieve the missing audio data from the primary ear piece 12s. A retransmission 2113 is not necessary.

In the configurations shown in FIGS. 20 and 21, the transmission in piconet P3 1630 resulted in an erroneously received packet, i.e., the audio packet was discarded because of errors in the payload, but the preamble and header were received correctly. This meant that the receiving unit knew that a packet had arrived, and knew its timing and length, but was unable to use the audio information in the payload. In the following, cases are considered when a packet is missed by the receiver, i.e., the receiver does not know a packet has arrived, and is also not aware of any timing information.

Figure 22:
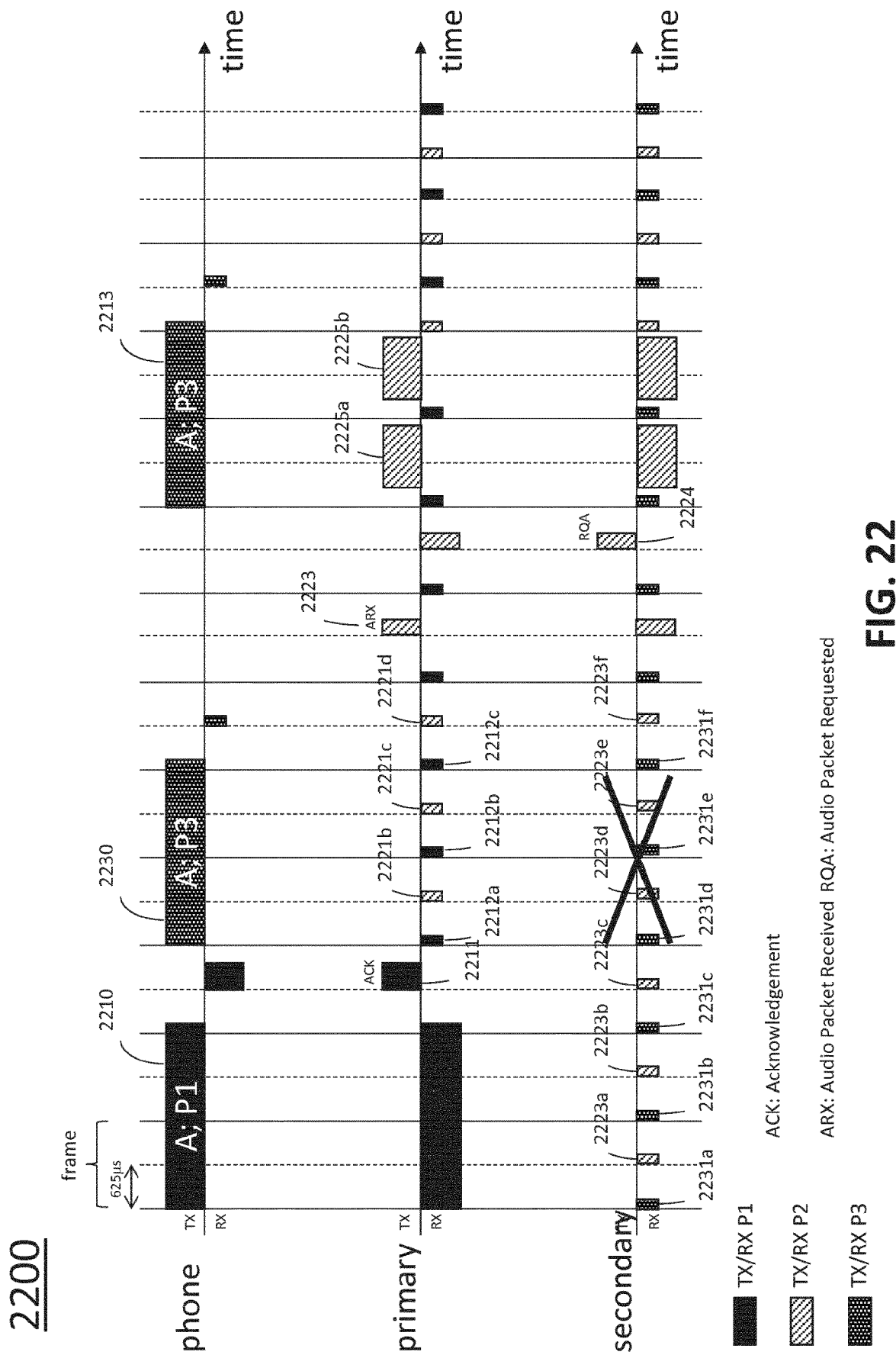
FIG. 22 is a sixth data flow and timing diagram of the third communication protocol.

Such a case is shown in the timing diagram 2200 of FIG. 22; packet 2230 on piconet P3 1630 is missed completely by the secondary ear piece 12s. The secondary ear piece 12s finds out about this missed transmission when it receives the ARX packet 2223 from the primary ear piece 12p via piconet P2 1620. On the reception of the ARX packet, the secondary ear piece 12s may wait for retransmission 2213. But with high probability, this packet will be missed or be erroneously received as well (or may not been sent at all since the phone 19 knows by the primary ACK 2211 that audio data is present in primary ear piece 12p). So instead, the secondary ear piece 12s may request a forwarding by the primary ear piece using RQA packet 2224 on piconet P2 1620. Instead of listening to P3 1630 for a retransmission, the secondary ear piece 12s will receive the forwarding packets 2225a, 2225b from the primary ear piece 12p, including the left audio information. The smartphone 19 should be dimensioned that it limits the number of retransmissions when no ACK is received. That is, it will skip to the next audio message when for instance two or three retransmissions have not been acknowledged, to prevent the audio stream from blocking.

Figure 23:
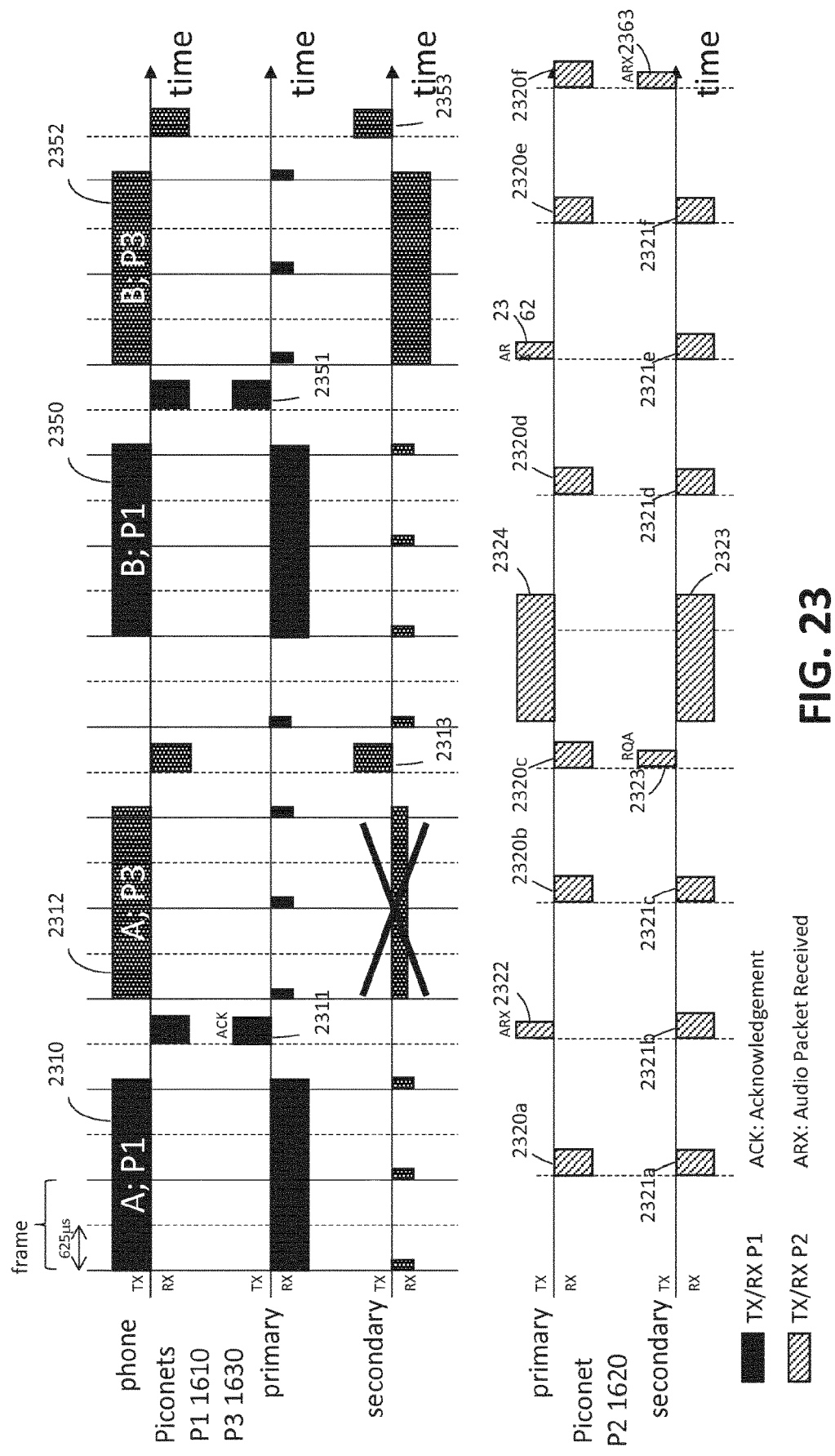
FIG. 23 is a data flow and timing diagram of a fourth communication protocol.

If the e2e link P2 1620 is not a radio link that operates in the same frequency band as P1 1610 and P3 1630, or if P2 1620 does not use radio at all but another technology such as magnetic communications, no timing multiplexing is required. That is, communications on P2 1620 may happen simultaneously with communications on P1 1610 or P3 1630. This is shown in the timing diagram 2300 of FIG. 23. Here, piconet P2 1620 is also divided into slots. For power consumption reasons, a transceiver only listens on the P2 1620 link at the beginning of the slot. When primary ear piece 12p has successfully received audio packet 2310 from the smartphone 19 via piconet P1 1610, it can inform the secondary ear piece 12s of this successful reception using ARX packet 2322 on piconet P2 1620. If subsequently the reception of audio packet 2312 on piconet P3 1630 is erroneous, the secondary ear piece 12s can nevertheless send ACK packet 2313 to the smartphone 19 on P3 1630, knowing it can retrieve this audio information from the primary ear piece 12p by sending RQA packet 2323 on piconet P2 1620. Thereafter, the primary ear piece 12p will forward the requested audio information using packet 2324 on piconet P2 1620. When the next audio messages are successfully transferred via packets 2350 and 2352 on P1 1610 to the primary ear piece 12a and on P3 1630 to the secondary ear piece 12s, respectively, the primary and secondary ear pieces 12p, 12s inform each other of their successful receptions using ARX packets 2362 and 2363 over the e2e link P2 1620.

Figure 24:
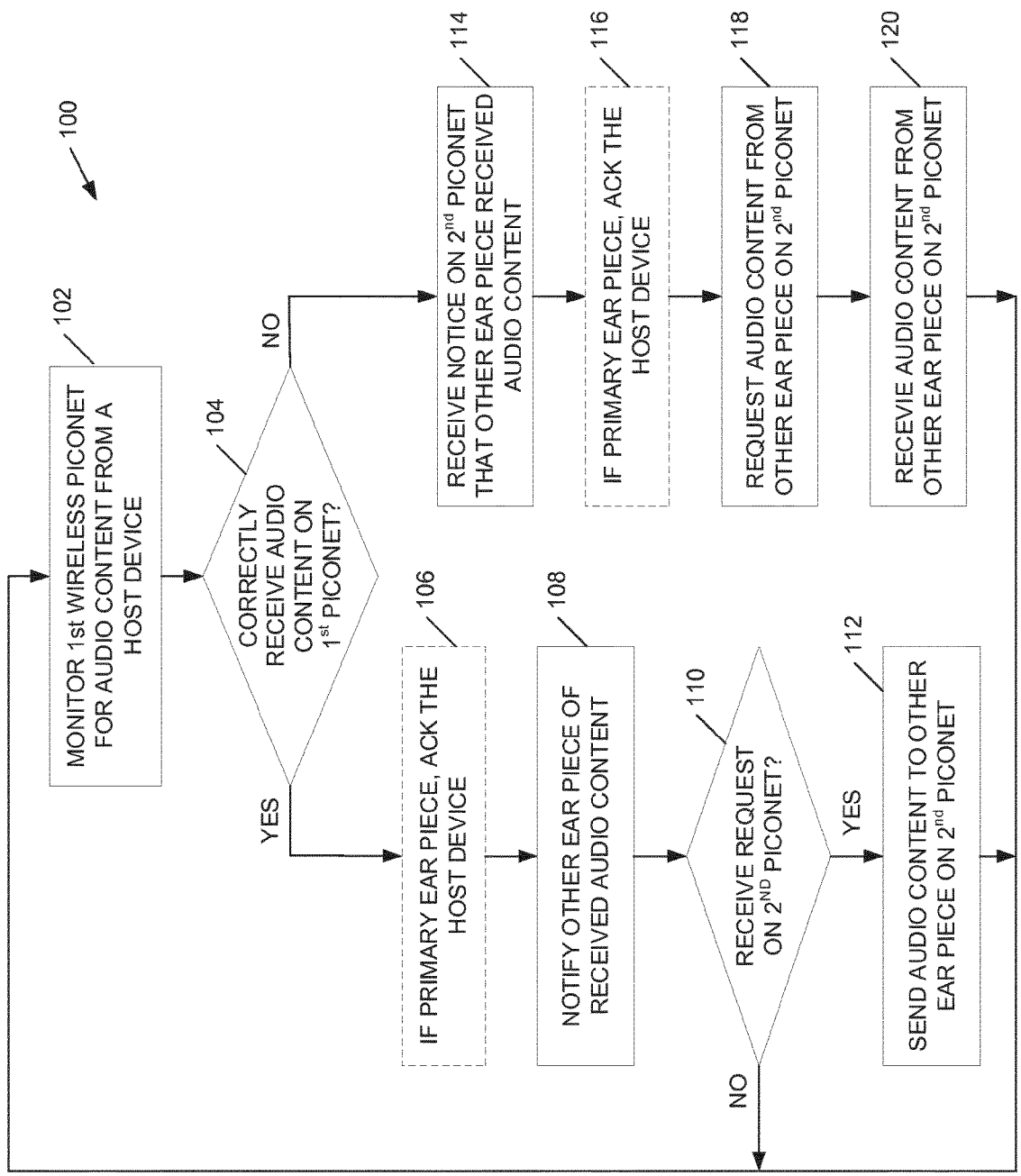
FIG. 24 is a flow diagram of a method of operating each ear piece of a wireless stereo headset.

FIG. 24 is a flow diagram of a method 100 of operating either ear piece 12a, 12b of a wireless stereo headset 12. That is, both the first and second ear pieces 12a, 12b perform the method 100. Without loss of generality and for ease of explanation, FIG. 24 will be described with respect to a first ear piece 12a.

The first ear piece 12a monitors a first wireless piconet P1 530, 1610 for audio content from a host device 19, such as a Bluetooth audio packet 400 (block 102). If the first ear piece 12a detects, and correctly receives, the audio content on the first wireless piconet P1 530, 1610 (block 104), then if it is currently designated as the primary ear piece 12p (that is, it has established a bidirectional communication channel with the host device 19), it sends an ACK message to the host device 19 on the first wireless piconet P1 530, 1610 (block 106). As indicated by the dashed line, if the first ear piece 12a is currently designated as the secondary ear piece 12s, block 106 is omitted. In either case, the first ear piece 12a then sends a notice to the second ear piece 12b, on a second piconet P2 540, 1620, that the host device 19 sent audio data, that it was correctly received, and that at least part of it was stored (block 108).

The first ear piece 12a then monitors the second piconet P2 540, 1620 for a possible request for the audio content from the second ear piece 12b. If no such request from the second ear piece 12b is received on the second piconet P2 540, 1620 (block 110)—that is, if the second ear piece 12b correctly received the packet on the first wireless piconet P1 530, or in another embodiment, on a third wireless piconet P3 1630—then control flows back to block 102, and the first ear piece 12a will monitor the first wireless piconet P1 530, 1610 for audio content, such as at the beginning of the next frame. However if, while monitoring the second piconet P2 540, 1620, a request for audio content is received from the second ear piece 12b (block 110), then the first ear piece 12a sends at least the portion of the audio content intended for the second ear piece 12b to the second ear piece 12b on the second piconet P2 540, 1620 (block 112).

If, at block 104, the first ear piece 12a did not correctly receive the audio content, then either it received it erroneously (errors only in payload) or it missed it (unaware of any packet transmission). In either case, the first ear piece 12a will receive a notice on the second piconet P2 540, 1620 that the second ear piece 12b successfully received the audio content and has the data intended for the first ear piece 12a. If the first ear piece 12a is currently designated as the primary ear piece 12p, it sends an ACK message to the host device 19 on the first wireless piconet P1 530, 1610 (block 116), to prevent further retransmissions. As indicated by the dashed line, if the first ear piece 12a is currently designated as the secondary ear piece 12s, block 116 is omitted. In either case, the first ear piece 12a then requests the audio content from the second ear piece 12b over the second piconet P2 540, 1620 (block 118), and receives the audio content from the second ear piece 12*b* in one or more packets over the second piconet P2 540, 1620 (block 120).

In one embodiment, the second ear piece 12*b* received the audio data by monitoring the first wireless piconet P1 530. In another embodiment, the second ear piece 12*b* received the audio data by monitoring a third wireless piconet P3 1630 between the second ear piece 12*b* and the host device 19. At the beginning of the next frame (whether or not it has received all audio data from the second ear piece 12*b*), the first ear piece 12*a* continues to monitor the first wireless piconet P1 530, 1610 for new audio content from the host device 19 (block 102). Of course, the second ear piece 12*b* concurrently performs the same method 100.

Figure 25:
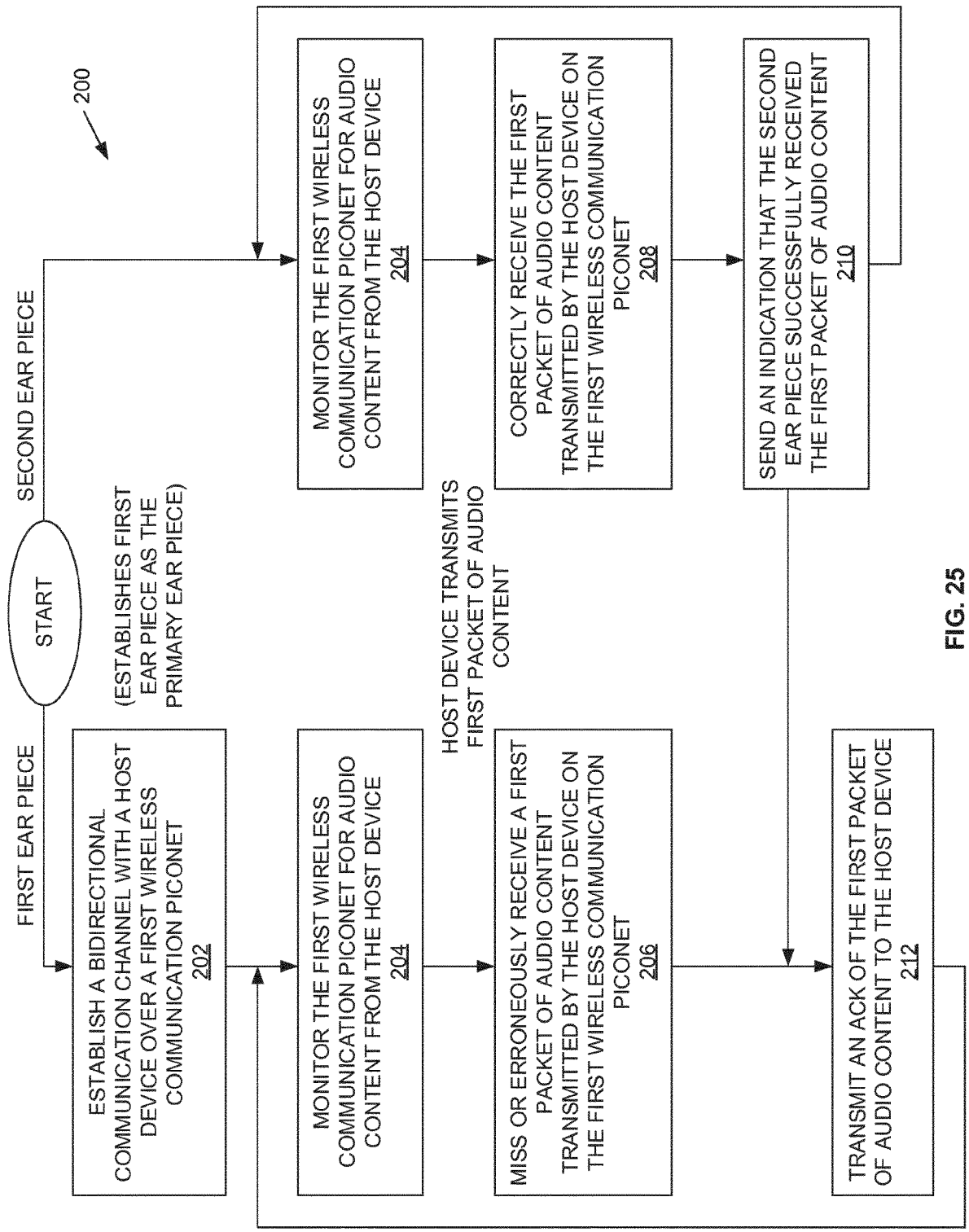
FIG. 25 is a flow diagram of a method of operating both ear pieces of a wireless stereo headset, in one embodiment.

FIG. 25 is a flow diagram of a method 200 of receiving audio content by a wireless stereo headset 12 comprising first 12*a* and second 12*b* ear pieces. FIG. 25 depicts the steps performed by the first ear piece 12*a* on the left, and those performed by the second ear piece 12*b* on the right. Initially, the first ear piece 12*a* establishes a bidirectional communication channel between the first ear piece 12*a* and a host device 19 over a first wireless communication piconet P1 530, 1610 (block 202). As indicated, this makes the first ear piece 12*a* the primary ear piece 12*p*. Both the first 12*a* and second 12B ear pieces monitor the first wireless communication piconet P1 530, 1610 for audio content from the host device 19 (block 204, which is depicted as occurring at each ear piece 12*a*, 12*b*).

The host device 19 then transmits a first packet of audio content. The first ear piece 12*a* misses or erroneously receives the first packet of audio content transmitted by the host device on the first wireless communication piconet P1 530, 1610 (block 206). However, the second ear piece 12*b* correctly receives the first packet of audio content transmitted by the host device on the first wireless communication piconet P1 530, 1610 (block 208). The second ear piece 12*b* sends to the first ear piece 12*a* an indication that the second ear piece 12*b* successfully received the first packet of audio content (block 210). In one embodiment, this indication may be sent on a second communication piconet P2, 540, 1620. In response to receiving this indication, and because it is the primary ear piece 12*p*, the first ear piece 12*a* transmits an acknowledgement of the first packet of audio content to the host device 19 (block 212), even though the first ear piece 12*a* itself did not receive the audio content and does not have it. This prevents a retransmission of the first packet of audio content by the host device 19. The first ear piece 12*a* can then request, and receive, the audio content intended for it from the second ear piece 12*b*, which correctly received the first packet and stored at least the portion of it intended for the first ear piece 12*a* (not shown). Each ear piece 12*a*, 12*b* then returns to monitoring the first wireless piconet P1 530, 1610 (in one embodiment, at a predetermined packet transmission starting point, such as the beginning of every frame) for a new packet of audio content.

Embodiments of the present invention present numerous advantages over the prior art. By exploiting path diversity to obtain audio information missed or erroneously received from a host device, embodiments of the present invention allow the host device to nevertheless be ACK'ed, thus freeing it from repeated retransmissions. This reduces traffic in the host-headset audio channel(s), and preserves battery life in the host device. Several flexible protocols are disclosed, allowing for efficient use of available spectrum for both host-headset and e2e synchronization and communications.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving audio content by a wireless stereo headset comprising first and second ear pieces, comprising:
   establishing a bidirectional communication channel between the first ear piece and a host device over a first wireless communication piconet;
   monitoring, by both the first and second ear pieces, the first wireless communication piconet for audio content from the host device;
   the first ear piece missing or erroneously receiving a first packet of audio content transmitted by the host device on the first wireless communication piconet;
   the second ear piece correctly receiving the first packet of audio content transmitted by the host device on the first wireless communication piconet;
   the second ear piece sending to the first ear piece an indication that the second ear piece successfully received the first packet of audio content; and
   the first ear piece transmitting an acknowledgement of the first packet of audio content to the host device, prior to receiving, from the second ear piece, any audio content from the first packet of audio content, to prevent a retransmission of the first packet of audio content by the host device.

2. The method of claim 1 wherein
   the communication channel of the first wireless communication piconet has a frame structure in the time domain; and
   monitoring, by both the first and second ear pieces, the first wireless communication piconet for audio content from the host device comprises monitoring the first wireless communication piconet at a predetermined packet transmission starting point in every frame.

3. The method of claim 2 wherein the second ear piece sending an indication to the first ear piece comprises the first and second ear pieces communicating over a second communication piconet.

4. The method of claim 3 wherein
   the second communication piconet employs the same technology and protocol as the first wireless communication piconet; and
   communications over the first and second piconets are time division multiplexed.

5. The method of claim 4 wherein both the first and second ear pieces allocate a time division duration to the first wireless communication piconet that includes the predetermined packet transmission starting point, and is of sufficient length to ascertain whether or not the host device is transmitting a packet of audio content.

6. The method of claim 4 further comprising using the same transceiver circuit to communicate over the first and second piconets.

7. The method of claim 3 wherein the second communication piconet comprises a Near Field Magnetic Induction (NFMI) communication channel.

8. The method of claim 3 wherein the second communication piconet comprises a wired connection to the second ear piece.

9. The method of claim 3 wherein at least some communications between the first and second ear pieces on the second communication piconet include a time stamp based on a common clock.

10. The method of claim 9 wherein the time stamp is related to an arrival time of the audio content sent by the host device over the first wireless communication piconet.

11. The method of claim 1 wherein the first wireless communication piconet comprises a radio frequency (RF) communication channel.

12. The method of claim 3 further comprising:
the first ear piece requesting audio content in the first packet from the second device over the second communication piconet; and
the second ear piece sending to the first ear piece the requested audio content over the second communication piconet.

13. The method of claim 3 further comprising:
the first ear piece correctly receiving a second packet of audio content transmitted by the host device on the first wireless communication piconet; and
the first ear piece sending to the second ear piece, over the second communication piconet, an indication that the first ear piece successfully received the second packet of audio content on the first wireless communication piconet.

14. The method of claim 3 further comprising:
monitoring the reception quality of audio content received by the first ear piece from the host device over the first wireless communication piconet;
when the reception quality falls below a predetermined threshold, the first and second ear pieces exchanging signaling over the second communication piconet swapping some functionality; and
establishing a bidirectional communication channel between the second ear piece and the host device over the first wireless communication piconet.

15. A wireless stereo headset comprising first and second ear pieces, comprising:
a first transceiver in the first ear piece adapted to:
establish a bidirectional communication channel between the first ear piece and a host device over a first wireless communication piconet;
monitor the first wireless communication piconet for audio content from the host device; and
transmit to the host device on the first wireless communication piconet an acknowledgement in response to receiving an indication from the second ear piece of successfully receiving a first packet of audio content that the first ear piece missed or received erroneously, wherein the acknowledgement is transmitted prior to receiving, from the second ear piece, any audio content from the first packet of audio content.

16. The wireless stereo headset of claim 15 wherein
the communication channel of the first wireless communication piconet has a frame structure in the time domain; and
monitoring the first wireless communication piconet for audio content from the host device comprises monitoring the first wireless communication piconet at a predetermined packet transmission starting point in every frame.

17. The wireless stereo headset of claim 16 further comprising:
a first transceiver in the second ear piece adapted to monitor the first wireless communication piconet for audio content from the host device at the predetermined packet transmission starting point in every frame.

18. The wireless stereo headset of claim 15 wherein the first wireless communication piconet comprises a radio frequency (RF) communication channel.

19. The wireless stereo headset of claim 15 wherein the first ear piece receiving an indication from the second ear piece of successfully receiving a packet of audio content comprises receiving the indication over a bidirectional communication channel between the first ear piece and the second ear piece over a second communication piconet.

20. The wireless stereo headset of claim 19 wherein
the first ear piece uses the same transceiver for the first and second communication piconets; and
communications over the first and second communication piconets are time division multiplexed.

21. The wireless stereo headset of claim 20 wherein both the first and second ear pieces allocate a time division duration to the first wireless communication piconet that includes the predetermined packet transmission starting point, and is of sufficient length to ascertain whether or not the host device is transmitting a packet of audio content.

22. The wireless stereo headset of claim 19 wherein the first ear piece further comprises a second transceiver adapted to support a Near Field Magnetic Induction (NFMI) communication channel forming the second communication piconet.

23. The wireless stereo headset of claim 19 wherein the first ear piece further comprises a modem adapted to support a wired connection forming the second communication piconet.

24. The wireless stereo headset of claim 19 wherein at least some communications between the first and second ear pieces on the second communication piconet include a time stamp based on a common clock.

25. The wireless stereo headset of claim 24 wherein the time stamp is related to an arrival time of the audio content sent by the host device over the first wireless communication piconet.

26. The wireless stereo headset of claim 19 wherein the first ear piece is adapted to:
request, from the second ear piece, over the second piconet, the missed or erroneously received packet of audio content; and
receive the requested audio content over the second communication piconet.

27. The wireless stereo headset of claim 19 wherein the first ear piece is further adapted to:
correctly receive, by the first transceiver, a second packet of audio content transmitted by the host device on the first wireless communication piconet; and
transmit to the second ear piece, over the second communication piconet, an indication that the first ear piece successfully received the second packet of audio content on the first wireless communication piconet.

28. The wireless stereo headset of claim 19 wherein the first transceiver in the second ear piece is further adapted to establish a bidirectional communication channel between the second ear piece and the host device over the first wireless communication piconetin response to signaling between the first and second ear pieces over the second communication piconet swapping functions in response to a metric of the quality of reception of audio content by the first ear piece falling below a predetermined threshold.

29. The wireless stereo headset of claim 15 wherein the first transceiver in the second ear piece is adapted to establish a bidirectional communication channel between the second ear piece and the host device over a third wireless communication piconet, and further comprising:

memory in each of the first and second ear pieces adapted to store at least audio content intended for the other ear piece from a packet of audio content received from and acknowledged to the host device on the first or third wireless communication piconet, respectively;

whereby the host device can avoid retransmitting audio content on either the first or third wireless communication piconets if it receives an acknowledgement on either the first or third wireless communication piconet for the audio content.

30. A method of receiving audio content by a wireless stereo headset comprising first and second ear pieces, comprising:

the first ear piece
    establishing a bidirectional communication channel between the first ear piece and the host device over a first wireless communication piconet;
    monitoring the first wireless communication piconet for audio content from the host device;
    in response to correctly receiving a packet containing audio content transmitted by the host device on the first wireless communication piconet, transmitting an acknowledgement of the packet to the host device on the first wireless communication piconet;
    storing audio content from the packet intended for the second ear piece; and
    informing the second ear piece of the correctly received packet over a second communication piconet between the first and second ear pieces; and the second ear piece
    establishing a bidirectional communication channel between the second ear piece and the host device over a third wireless communication piconet different than the first wireless communication piconet;
    monitoring the third wireless communication piconet for audio content from the host device;
    in response to correctly receiving the packet containing audio content also transmitted by the host device on the third wireless communication piconet, transmitting an acknowledgement of the packet to the host device on the third wireless communication piconet;
    storing audio content from the packet intended for the first ear piece; and
    informing the first ear piece of the correctly received packet over the second communication piconet;

whereby the host device can avoid retransmitting the packet containing audio content on either the first or third wireless communication piconets if it receives an acknowledgement on either the first or third wireless communication piconet for the respective packet containing audio content.

31. A method of receiving audio content by a wireless stereo headset comprising first and second ear pieces, comprising:

establishing a bidirectional communication channel between the first ear piece and a host device over a first wireless communication piconet;

the first ear piece correctly receiving a first packet of audio content transmitted by the host device on the first wireless communication piconet;

the first ear piece sending to the second ear piece an indication that the first ear piece successfully received the first packet of audio content; and the first ear piece transmitting an acknowledgement of the first packet of audio content to the host device, prior to transmitting any audio content from the first packet of audio content to the second ear piece, to prevent a retransmission of the first packet of audio content by the host device.

* * * * *